(12) United States Patent
Itakura

(10) Patent No.: US 11,141,944 B2
(45) Date of Patent: Oct. 12, 2021

(54) MANUFACTURING METHOD AND MANUFACTURING DEVICE OF TIRE BELT

(71) Applicant: Toyo Tire & Rubber Co., Ltd., Itami (JP)

(72) Inventor: Junji Itakura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 232 days.

(21) Appl. No.: 16/218,557

(22) Filed: Dec. 13, 2018

(65) Prior Publication Data

US 2019/0202158 A1     Jul. 4, 2019

(30) Foreign Application Priority Data

Dec. 28, 2017    (JP) .............................. JP2017-254639

(51) Int. Cl.
     *B29D 30/70*      (2006.01)
     *B29D 30/30*      (2006.01)
     (Continued)

(52) U.S. Cl.
     CPC ......... *B29D 30/70* (2013.01); *B29D 30/0681* (2013.01); *B29D 30/3007* (2013.01);
     (Continued)

(58) Field of Classification Search
     CPC .. B29D 30/0016; B29D 30/24; B29D 30/242; B29D 30/38; B29D 30/70; B29D 2030/0038; B29D 2030/088; B29D 2030/1685; B29D 2030/2685; B29D 2030/2692; B29D 2030/381; B29D 2030/487; B29D 2030/705; B60C 9/18; B60C 9/20; B65H 5/28
     (Continued)

(56) References Cited

U.S. PATENT DOCUMENTS 4,769,104 A *   9/1988   Okuyama .......... B29D 30/3007
     156/406.4
2003/0051794 A1*   3/2003   Suda ...................... B26D 3/003
     156/123
(Continued)

FOREIGN PATENT DOCUMENTS

| JP | 2001-232695 A | | 8/2001 |
|---|---|---|---|
| JP | 2006281621 A | * | 10/2006 |
| JP | 2017-30172 A | | 2/2017 |

OTHER PUBLICATIONS

Yuzo Kuroki, JP-2006281621-A, machine translation. (Year: 2006).*

*Primary Examiner* — Katelyn W Smith
*Assistant Examiner* — Sedef E Paquette
(74) *Attorney, Agent, or Firm* — Westerman, Hattori, Daniels & Adrian, LLP

(57) ABSTRACT

A manufacturing method includes cutting out a sheet-like belt for one full circle of tire by cutting a master roll diagonally with respect to a longitudinal direction between a master roll table 10 and a belt table 14, moving the belt table 14 carrying the cut-out sheet-like belt to a winding position of the sheet-like belt, winding the sheet-like belt around a winding cylinder 50 at the winding position, and unwinding the sheet-like belt from the winding cylinder 50 in a place facing a molding drum 64 and forming a cylindrical belt by winding the sheet-like belt around the molding drum 64.

14 Claims, 27 Drawing Sheets

(51) Int. Cl.
    *B29D 30/06* (2006.01)
    *B29D 30/38* (2006.01)
    *B29D 30/48* (2006.01)
    *B29D 30/24* (2006.01)
    *B29D 30/08* (2006.01)
    *B60C 9/20* (2006.01)

(52) U.S. Cl.
    CPC ............ *B29D 30/38* (2013.01); *B29D 30/48* (2013.01); *B29D 2030/088* (2013.01); *B29D 2030/241* (2013.01); *B29D 2030/381* (2013.01); *B29D 2030/705* (2013.01); *B60C 9/20* (2013.01)

(58) Field of Classification Search
    USPC ................ 156/64, 378, 394.1, 397; 152/538
    See application file for complete search history.

(56) References Cited

U.S. PATENT DOCUMENTS

| | | | |
|---|---|---|---|
| 2007/0003649 A1* | 1/2007 | Kaagman | B65H 9/16 425/29 |
| 2008/0066851 A1* | 3/2008 | Sata | B29D 30/48 156/136 |
| 2012/0111473 A1* | 5/2012 | Hasegawa | B29C 66/71 156/64 |
| 2012/0234451 A1* | 9/2012 | Miyake | B60C 9/2006 152/537 |
| 2014/0196834 A1* | 7/2014 | Grashuis | B29D 30/30 156/117 |
| 2014/0345784 A1* | 11/2014 | D'Oria | B29D 30/0685 156/115 |
| 2019/0160771 A1* | 5/2019 | Liu | B60C 9/28 |

\* cited by examiner

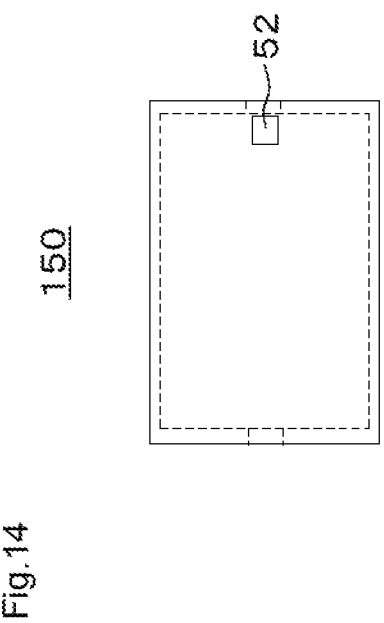

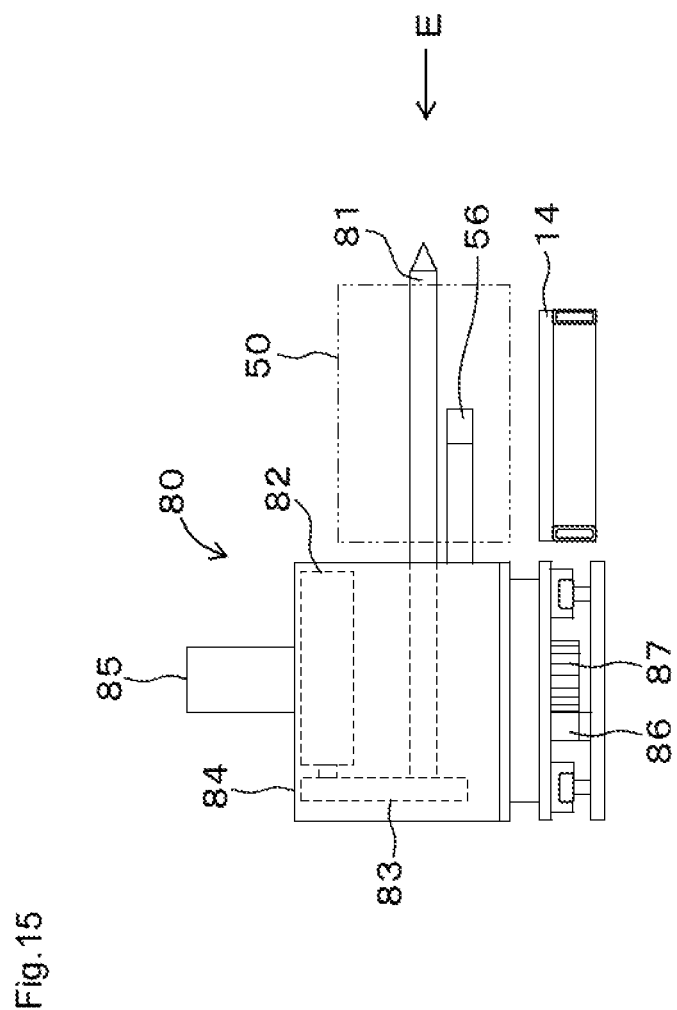

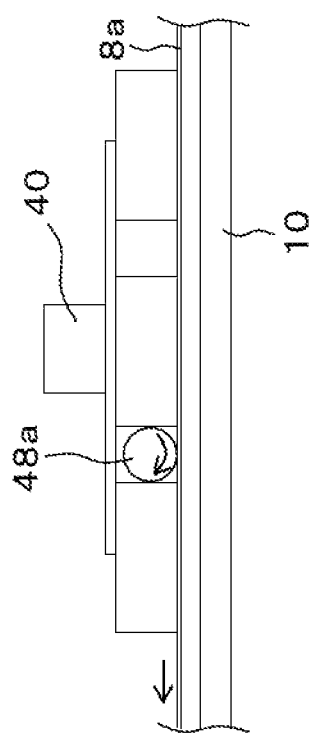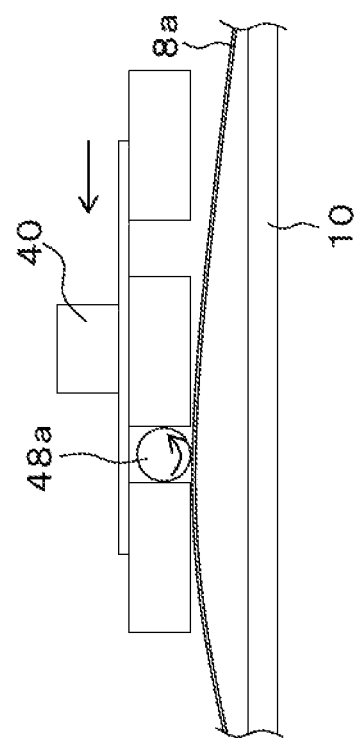

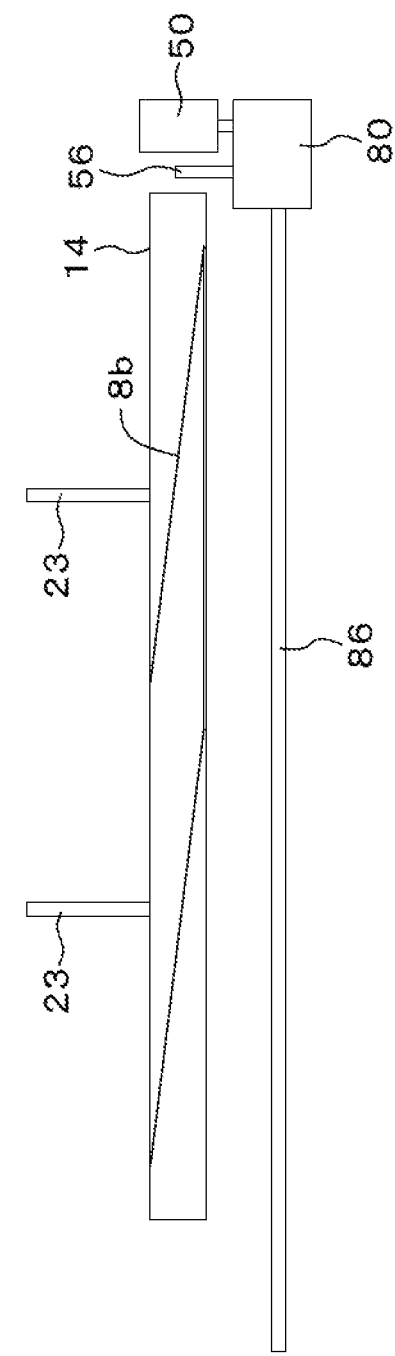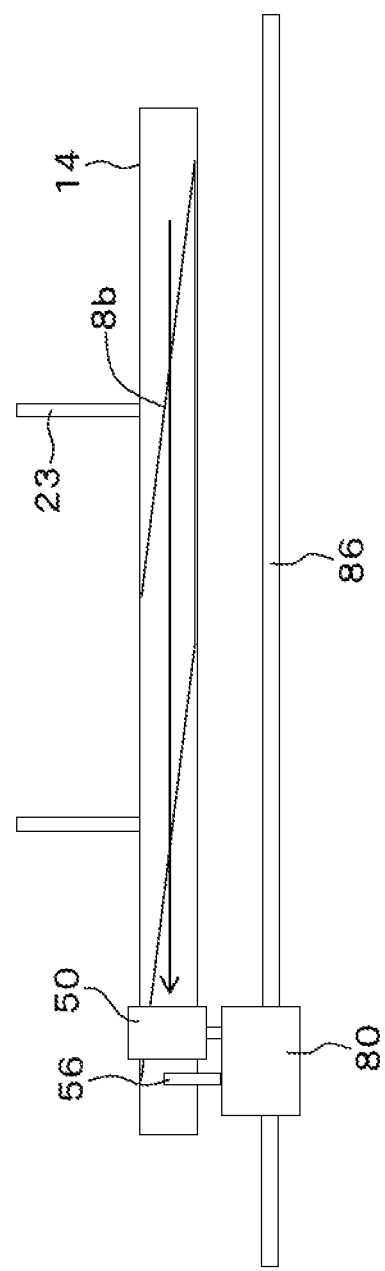

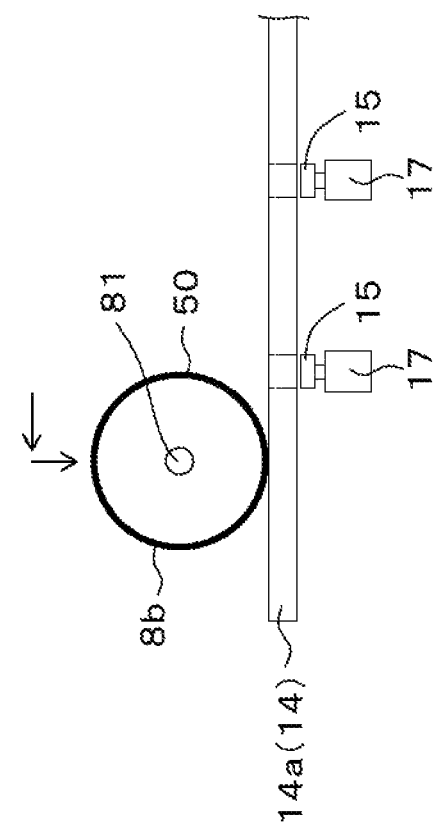

MANUFACTURING METHOD AND MANUFACTURING DEVICE OF TIRE BELT

CROSS-REFERENCE TO RELATED APPLICATION

The present application is based on Japanese Patent Application No. 2017-254639 (filing date: Dec. 28, 2017) and claims the benefit of Japanese Patent Application No. 2017-254639. The entire subject matter of Japanese Patent Application No. 2017-254639 is hereby incorporated herein.

TECHNICAL FIELD

The present invention relates to a manufacturing method and a manufacturing device of a tire belt.

BACKGROUND ART

A belt of a pneumatic tire is formed by covering multiple cords extending diagonally with respect to a tire circumferential direction with rubber. The belt is manufactured from a long member called a master roll formed of multiple cords covered with rubber. An extending direction of the cords in a master roll coincides with a longitudinal direction of the master roll.

According to a manufacturing method of a belt in the related art as is described in, for example, Patent Literature 1, firstly cut sheets are manufactured by cutting a master roll diagonally with respect to the longitudinal direction (that is, the cord extending direction), subsequently a long intermediate sheet is manufactured by joining lateral sides of the cut sheets, and finally a sheet-like belt for one full circle of tire is manufactured by cutting the intermediate sheet in a predetermined length. Normally, at some point of the manufacturing method, the intermediate sheet is wound around a cylindrical winding cylinder called a bobbin or the like and transported to a following step in a distant place or stored temporarily. Also, the intermediate sheet is cut in front of a molding drum just before the sheet-like belt is laminated onto the molding drum.

Recently, a sheet-like belt that can be formed by cutting a master roll only once and therefore does not have joint portions of multiple cut sheets has been invented as is described in Patent Literature 2. However, a manufacturing method of such a belt has not been established.
Patent Literature 1: JP-A-2001-232695
Patent Literature 2: JP-A-2017-30172

SUMMARY OF THE INVENTION

An object of the present invention is to provide novel manufacturing method and manufacturing device of a tire belt that can be formed by cutting a master roll only once.

A manufacturing method of a tire belt of the present invention is a manufacturing method of a tire belt for manufacturing a sheet-like belt first from a master roll formed by covering multiple belt cords lined up parallel to one another with rubber while aligning a longitudinal direction in an extending direction of the belt cords, and then forming a cylindrical belt by winding the sheet-like belt around a molding drum. The manufacturing method is characterized by including: placing the master roll on a master roll table; feeding the master roll from the master roll table to a belt table situated adjacent to the master roll table in a same direction as the longitudinal direction of the master roll; cutting out a portion of the master roll placed on the belt table as the sheet-like belt for one full circle of tire by cutting the master roll diagonally with respect to the longitudinal direction between the master roll table and the belt table; moving the belt table carrying the cut-out sheet-like belt for one full circle of tire to a winding position of the sheet-like belt; winding the sheet-like belt for one full circle of tire around a single winding cylinder at the winding position; moving the sheet-like belt wound around the winding cylinder to a place facing the molding drum; and unwinding the sheet-like belt from the winding cylinder in the place facing the molding drum and forming the cylindrical belt by winding the unwound sheet-like belt around the molding drum in one full circle.

Also, a manufacturing device of a tire belt of the present invention is a manufacturing device of a tire belt manufacturing a sheet-like belt first from a master roll formed by covering multiple belt cords line up parallel to one another with rubber while aligning a longitudinal direction in an extending direction of the belt cords, and then forming a cylindrical belt by winding the sheet-like belt around a molding drum. The manufacturing device is characterized by including: a master roll table on which the master roll is placed; a belt table situated adjacent to the master roll table and accepting the master roll fed from the master roll table; a cutting device cutting out a portion of the master roll placed on the belt table as the sheet-like belt for one full circle of tire by cutting the master roll diagonally with respect to the longitudinal direction between the master roll table and the belt table; a moving device moving the belt table carrying the cut-out sheet-like belt for one full circle of tire from a cutting position to a winding position of the sheet-like belt; a winding cylinder around which the sheet-like belt for one full circle of tire is wound at the winding position; and the molding drum around which the sheet-like belt unwound from the winding cylinder is wound in one full circle.

The present invention provides the novel manufacturing method and manufacturing device of a tire belt as described above.

BRIEF DESCRIPTION OF THE DRAWINGS

FIG. 14 is a view of a winding cylinder of a modification when viewed from radially outside;

FIG. 15 is a view of a winding device when viewed in an extending direction of a rack;

FIGS. 21A and 21B are views showing a manner in which a detection is made by the slip detector with arrows indicating a moving direction of the master roll and a rotation direction of a roller, FIG. 21A being a view showing a manner in which the slip detector detects that the master roll slips on the second hand and FIG. 21B being a view showing a manner in which the slip detector detects that the master roll is partially floating;

FIG. 23A is a view of the belt table moved to the belt winding position and FIG. 23B is a view showing a movement of the winding device to a winding start position with an arrow indicating length measuring position and measuring direction of a laser displacement sensor;

FIG. 25 is a view showing a manner in which the winding cylinder is pressed against a winding end tip of the sheet-like belt with arrows indicating moving directions of the winding cylinder;

FIG. 26C being a view showing a manner in which the sheet-like belt is wound by a third turn, and FIG. 26D being a view showing a manner in which the sheet-like belt is wound by a fourth turn.

MODE FOR CARRYING OUT THE INVENTION

Figure 1:
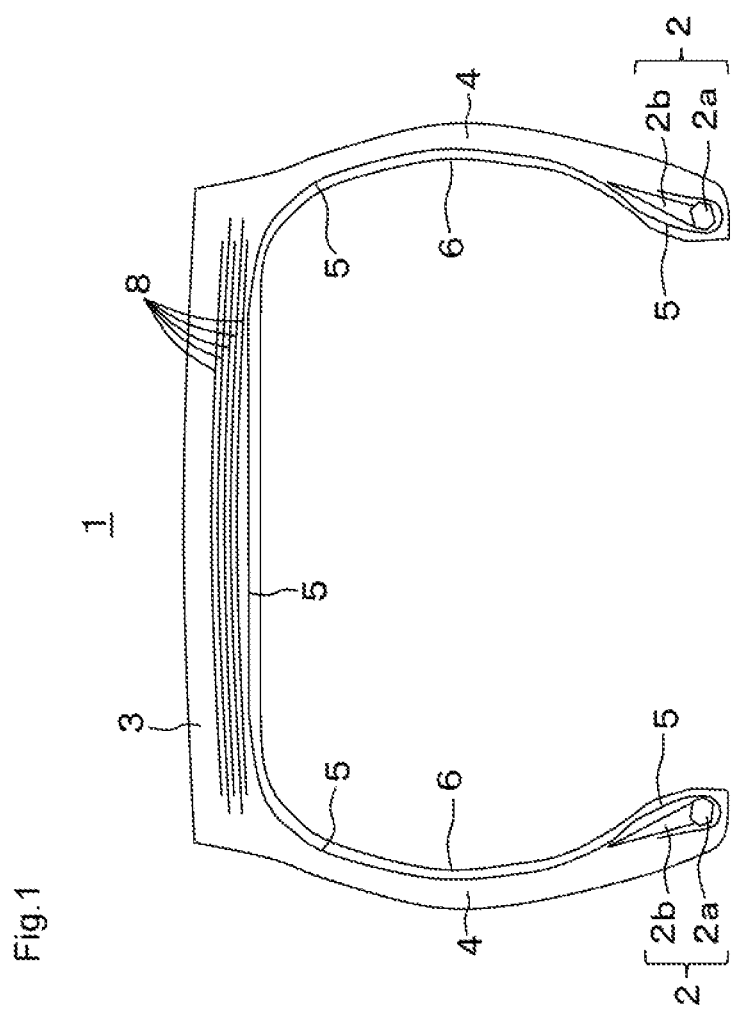
FIG. 1 is a sectional view of a pneumatic tire in a width direction.

An embodiment will be described according to the drawings. It should be understood that the embodiment is a mere example and modification made as needed without deviating from the spirit of the present invention are included within the scope of the present invention. A size, a shape, and the like may be exaggerated or represented schematically in the drawings for ease of description. It should be understood, however, that the drawings are also mere examples and by no means limit an interpretation of the present invention.

1. Structure and Manufacturing Method of Entire Pneumatic Tire 1

(1) Structure of Entire Pneumatic Tire 1

An example of a pneumatic tire 1 is shown in FIG. 1. The pneumatic tire 1 is a heavy load radial tire used in, for example, a truck or a bus.

Bead portions 2 are provided on both sides of the pneumatic tire 1 in a width direction. The bead portion 2 includes a bead core 2a formed of a circularly-wound steel wire and a bead filler 2b made of rubber and provided on an outside of the bead core 2a in a radial direction. A carcass ply 5 is bridged between the bead portions 2 on the both sides in the tire width direction. The carcass ply 5 is a sheet-like member formed by covering a large number of ply cords lined up in a direction orthogonal to a tire circumferential direction with rubber. The carcass ply 5 not only forms a framework shape of the pneumatic tire 1 between the bead portions 2 on the both sides in the tire width direction, but also wraps the bead portions 2 by being folded inside out in the tire width direction about the bead portions 2. A sheet-like inner liner 6 having a rubber layer with low air permeability is laminated to an inner side of the carcass ply 5.

Multiple belts 8 are provided on an outside of the carcass ply 5 in a tire radial direction. A structure of the belt 8 will be described below. A tread rubber 3 having a contact patch is provided on an outside of the belt 8 in the tire radial direction. Also, side wall rubbers 4 are provided on both sides of the carcass ply 5 in the tire width direction. Besides the foregoing members, members, such as a pad under belt and a chafer, are provided as a functional need of the pneumatic tire 1 arises.

(2) Manufacturing Method of Entire Pneumatic Tire 1

An example of a manufacturing method of the pneumatic tire 1 having the structure as above will be described briefly. Firstly, the respective members specified above as forming the pneumatic tire 1 are prepared. A sheet-like belt 8b cut out from a master roll 8a as will be described below is prepared as a member which finally forms the belt 8 of the pneumatic tire 1.

Subsequently, a cylindrical belt 8c (see FIG. 2) is manufactured by winding the prepared sheet-like belt 8b around a molding drum 64 (see FIG. 2). Because the pneumatic tire 1 has multiple belts 8, multiple sheet-like belts 8b are wound around the molding drum 64 one after another. Multiple cylindrical belts 8c overlapping one another are thus manufactured. Subsequently, the tread rubber 3 is laminated to an outer diameter side of the cylindrical belts 8c. A cylindrical tread ring formed of the multiple cylindrical belts 8c and the tread rubber 3 is thus completed.

The sheet-like inner liner 6 and the sheet-like carcass ply 5 are laminated onto another cylindrical drum. A cylindrical body called a primary case is thus completed. Subsequently, the annular bead portions 2 are set on both sides of the primary case in an axial direction.

Subsequently, shaping is performed, by which the primary case is formed into a toroidal shape by inflating the primary case radially outward between the bead portions 2 on the both sides. The tread ring is laminated to an outer diameter side of a toroidally inflated portion of the primary case. During the shaping, turn-up is also performed, by which the carcass ply 5 is folded about the bead portions 2. In addition, the side wall rubbers 4 are laminated to the toroidally inflated portion of the primary case from both sides in the axial direction. An unvulcanized tire is thus completed.

Subsequently, the pneumatic tire 1 is completed by subjecting the unvulcanized tire to vulcanization molding in a mold. The cylindrical belt 8c subjected to vulcanization forms the belt 8 of the pneumatic tire 1.

It should be understood that the manufacturing method described as above is a mere example and a modification, such as changing the order in part, can be made to the description above as a need arises. For example, the side wall rubbers 4 may be laminated to predetermined positions after the bead portions 2 are set to the primary case and the turn-up is performed, followed by the shaping.

(3) Summary of Structure and Manufacturing Method of Belt 8

The belt 8 is formed by covering multiple belt cords 9 (see FIG. 2) extending diagonally with respect to the tire circumferential direction with rubber. In the present embodiment, the belt cords 9 are made of steel. However, the belt cords 9 made of organic fiber are also available. At least one of the multiple belts 8 included in the pneumatic tire 1 is manufactured from the master roll 8a and the sheet-like belt 8b described in the following.

Figure 2A:
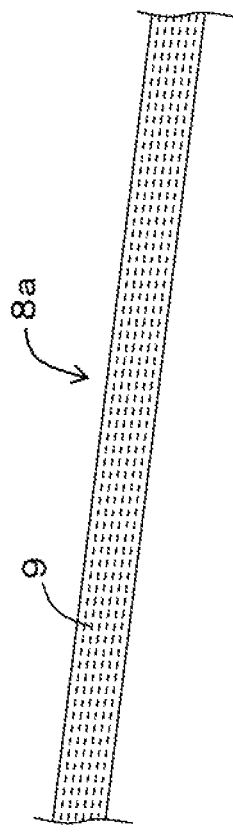
FIG. 2A is a plan view of a master roll.

As is shown in FIG. 2A, the master roll 8a is formed by covering the multiple belt cords 9 lined up parallel to one another with unvulcanized rubber. An extending direction of the belt cords 9 coincides with a longitudinal direction of the master roll 8a.

Figure 2B:
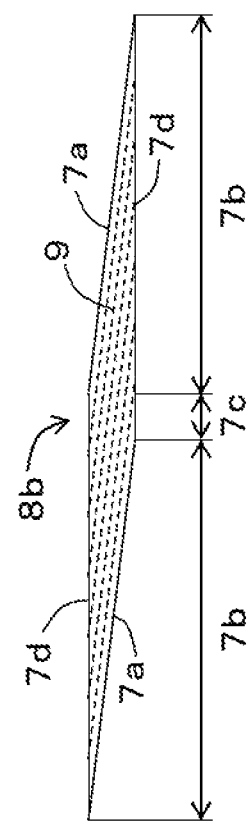
FIG. 2B is a plan view of a sheet-like belt.

The sheet-like belt 8b shown in FIG. 2B is cut out by cutting the master roll 8a diagonally with respect to the longitudinal direction. Cut side portions 7d, which are cutting marks of the master roll 8a, form both side portions of the sheet-like belt 8b in a width direction. An extending direction of the cut side portions 7d coincides with the longitudinal direction of the sheet-like belt 8b. Portions which were both sides of the master roll 8a in the width direction form inclined side portions 7a with respect to the longitudinal direction of the sheet-like belt 8b. The inclined side portions 7a are parallel to the belt cords 9.

An angle produced between the longitudinal direction of the sheet-like belt 8b and the belt cords 9 (this angle is equal to an angle produced between the longitudinal direction of the sheet-like belt 8b and the inclined side portions 7a and also equal to a cutting angle of the master roll 8a with respect to the longitudinal direction) is small, and for example, in a range of 6° to 9° both inclusive. In a case where an angle produced between the longitudinal direction of the sheet-like belt 8b and the belt cords 9 is small as above, a restraint force of the finished belt 8 in the tire radial direction becomes high.

Let $\theta$ be a cutting angle of the master roll 8a with respect to the longitudinal direction of the master roll 8a and L be a length of the cut side portions 7d, then a width W of the master roll 8a is set to satisfy an equation: $W = L \times \sin\theta$.

Figure 2C:
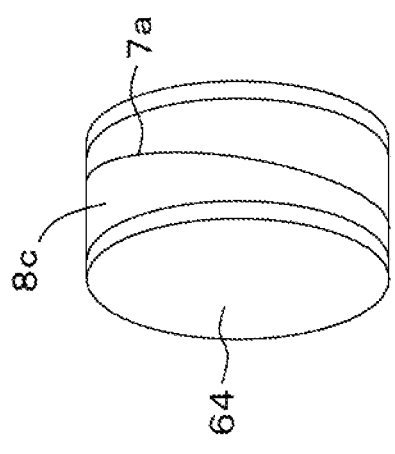
FIG. 2C is a perspective view of a cylindrical belt.

As is shown in FIG. 2C, the sheet-like belt 8b is wound around the molding drum 64 and forms the cylindrical belt 8c.

2. Manufacturing Device of Tire Belt

A device manufacturing a tire belt, that is, the cylindrical belt 8c used in the pneumatic tire 1 will be described.

(1) Overall Structure

Figure 3:
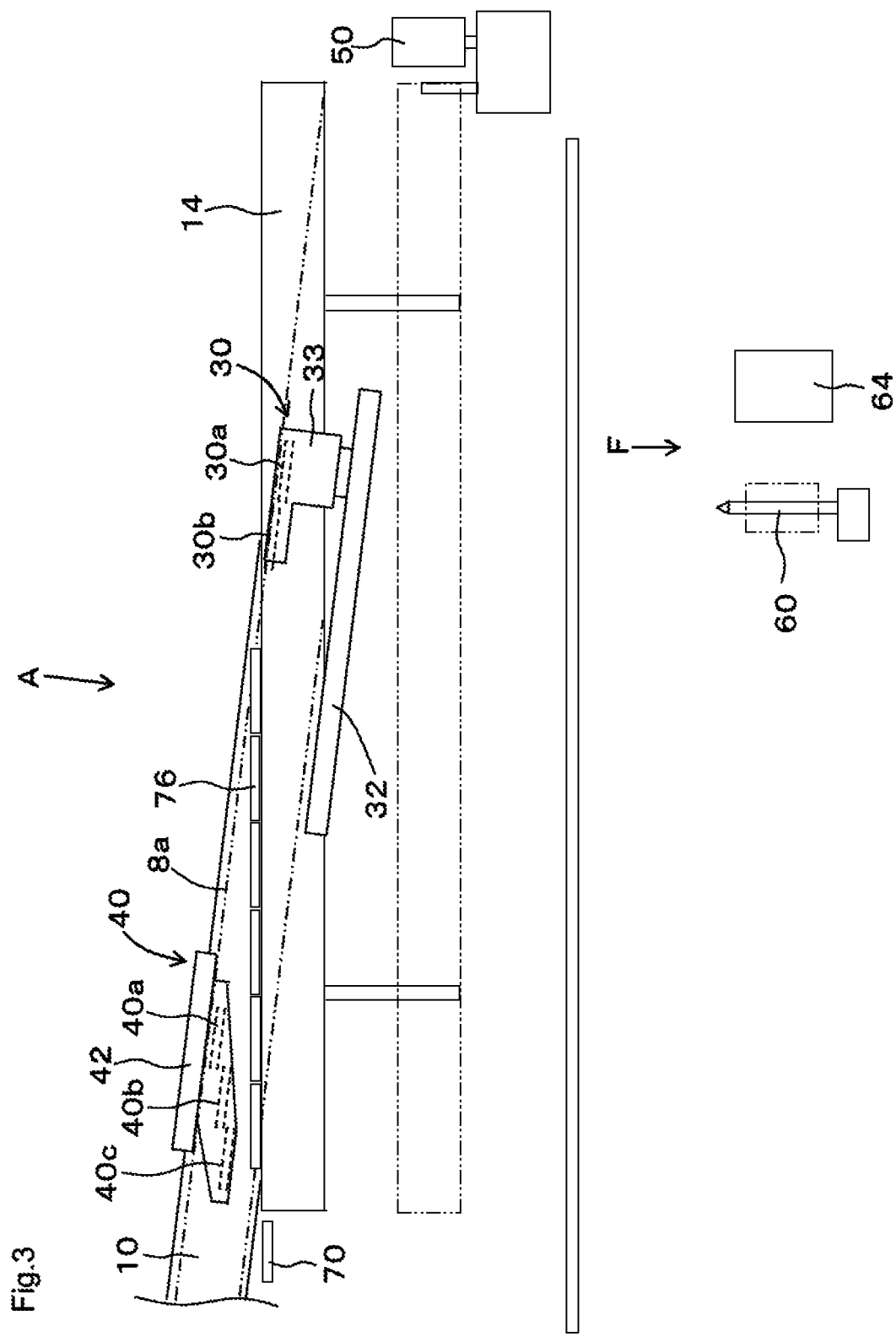
FIG. 3 is a plan view of an entire manufacturing device of a tire belt.

An overall structure of a manufacturing device of a tire belt is shown in FIG. 3. The manufacturing device of a tire belt has a master roll table 10 on which to place the master roll 8a, a belt table 14 situated adjacent to the master roll table 10 and accepting the master roll 8a fed from the master roll table 10, a first hand 30 and a second hand 40 feeding the master roll 8a from the master roll table 10 to the belt table 14, and a cutting device 70 cutting out the sheet-like belt 8b on the belt table 14 by cutting the master roll 8a between the master roll table 10 and the belt table 14.

Further, the manufacturing device of a tire belt has a winding cylinder 50 (also called a bobbin) around which to wind the sheet-like belt 8b on the belt table 14, a laminating device 60 to which the winding cylinder 50 wound with the sheet-like belt 8b is transported and attached, and the molding drum 64 onto which the sheet-like belt 8b unwound from the winding cylinder 50 attached to the laminating device 60 is laminated and molded into the cylindrical belt 8c.

Detailed structures of the respective portions forming the manufacturing device of a tire belt will be described in the following.

(2) Structure of Master Roll Table 10

Figure 4:
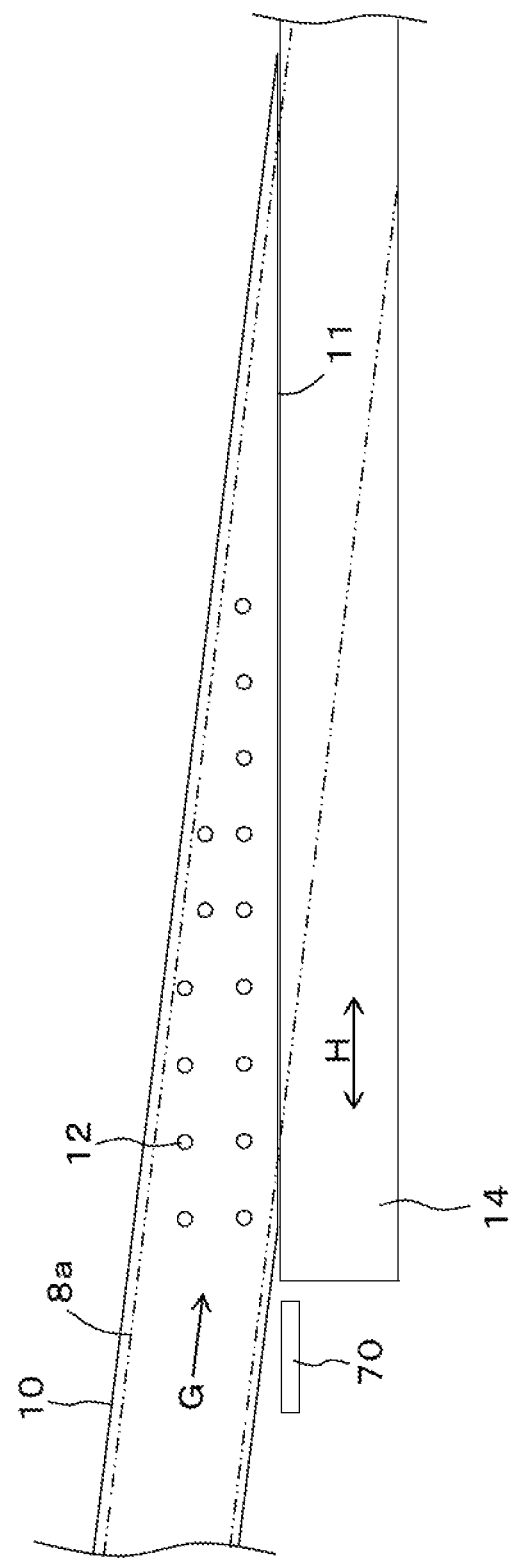
FIG. 4 is a plan view of a master roll table.

The master roll 8a is placed on the master roll table 10. As is shown in FIG. 4, a longitudinal direction of the master roll table 10 coincides with a feeding direction of the master roll 8a indicated by an arrow G of FIG. 4 and inclines with respect to a longitudinal direction of the belt table 14 indicated by an arrow H of FIG. 4. An edge 11 of the master roll table 10 situated adjacent to the belt table 14 inclines with respect to the longitudinal direction of the master roll table 10 and extends in a same direction as the longitudinal direction of the belt table 14. An angle of inclination of the edge 11 with respect to the longitudinal direction of the master roll table 10 is equal to a cutting angle of the master roll 8a with respect to the longitudinal direction.

Multiple blow holes 12 lined up parallel to the edge 11 in one or more than one row are provided to the master roll table 10 in a portion on a forward side in the feeding direction. The blow holes 12 are connected to an unillustrated pipe under the master roll table 10 and the pipe is connected to an unillustrated air supply device. With this structure, air supplied from the air supply device passes through the pipe and blows out upward from the blow holes 12.

(3) Structures of First Hand 30 and Second Hand 40

The first hand 30 is a device which holds a front part of the master roll 8a in the feeding direction when the master roll 8a is fed from the master roll table 10 to the belt table 14. As is shown in FIG. 3, a first hand rail 32 extending in the feeding direction of the master roll 8a is provided above the belt table 14. The first hand 30 is allowed to move above and between the master roll table 10 and the belt table 14 along the first hand rail 32.

Figure 5:
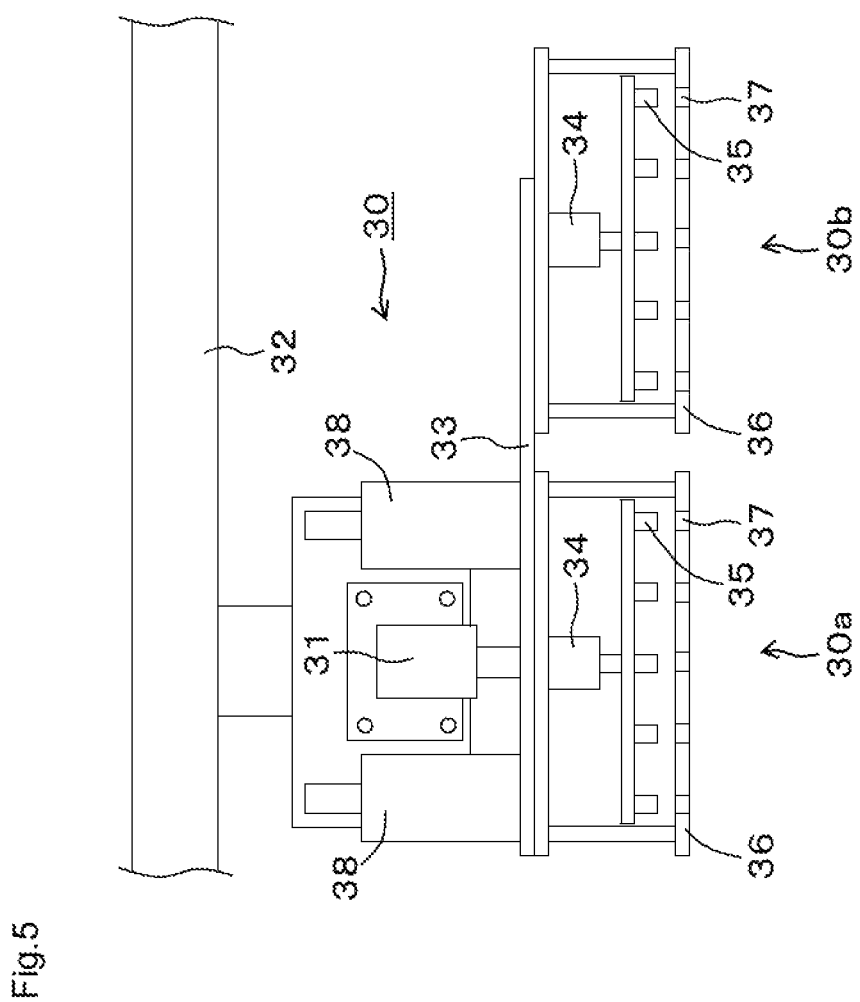
FIG. 5 is a view of a first hand when viewed in a direction indicated by an arrow A of FIG. 3.

As is shown in FIG. 5, the first hand 30 has an air cylinder 31 as a lifting device, a single horizontal top plate 33 attached to the air cylinder 31, and two hand portions 30a and 30b attached to a bottom surface of the top plate 33. The two hand portions 30a and 30b are line up in the feeding direction of the master roll 8a. In association with a movement of the air cylinder 31, the top plate 33 and the two hand portions 30a and 30b are guided by a guide 38 disposed between the air cylinder 31 and the top plate 33 and move up and down as one unit.

The hand portion 30a has a contact plate 36 disposed below the top plate 33 and apart from the top plate 33. The contact plate 36 is fixed to the top plate 33 and moves up and down with the top plate 33 as one unit in association with a movement of the air cylinder 31. The contact plate 36 is provided with multiple magnet holes 37 lined up in the feeding direction of the master roll 8a.

Further, the hand portion 30a has one air cylinder 34 as a lifting device attached to the top plate 33 and situated above the contact plate 36, and multiple magnets 35 as attracting means attached to the air cylinder 34. The multiple magnets 35 are lined up in the feeding direction of the master roll 8a. The multiple magnets 35 move up and down as one unit in association with a movement of the air cylinder 34. The multiple magnets 35 sink into respective magnet holes 37 in the contact plate 36 when they move down in association with a movement of the air cylinder 34 and rises above the contact plate 36 when they move up in association with a movement of the air cylinder 34.

The other hand portion 30b has a same structure as the hand portion 30a described above.

Owing to the structure as above, when the contact plate 36 moves down and comes in close proximity to the master roll 8a on the master roll table 10 in association with a movement of the air cylinder 31 and further the magnets 35 move down and sink into the magnet holes 37 of the contact plate 36 in association with a movement of the air cylinder 34, the master roll 8a having the steel belt cords 9 are attracted to the magnets 35. In this manner, the first hand 30 holds the master roll 8a by forcing the master roll 8a to float above the master roll table 10 and the belt table 14 by attraction.

When the magnets 35 move up in association with a movement of the air cylinder 34 while the first hand 30 is holding the master roll 8a or the contact plate 36 also moves up in association with a movement of the air cylinder 31 after the magnets 35 move up, the master roll 8a falls off the first hand 30. In this manner, the first hand 30 releases the master roll 8a.

The second hand 40 is a device which holds a rear part (a rearward part trailing the front part in the feeding direction) of the master roll 8a when the master roll 8a is fed from the master roll table 10 to the belt table 14. As is shown in FIG. 3, a second hand rail 42 extending in the feeding direction of the master roll 8a is provided above the master roll table 10. The second hand 40 is allowed to move along the second hand rail 42.

The second hand 40 has an air cylinder 41 as a lifting device, a single horizontal top plate 43 attached to the air cylinder 41, and three hand portions 40a, 40b, and 40c attached to a bottom surface of the top plate 43. The three hand portions 40a, 40b, and 40c are lined up in the feeding direction of the master roll 8a. In association with a movement of the air cylinder 41, the top plate 43 and the three hand portions 40a, 40b, and 40c are guided by a guide 49 disposed between the air cylinder 41 and the top plate 43 and move up and down as one unit.

Figure 6:
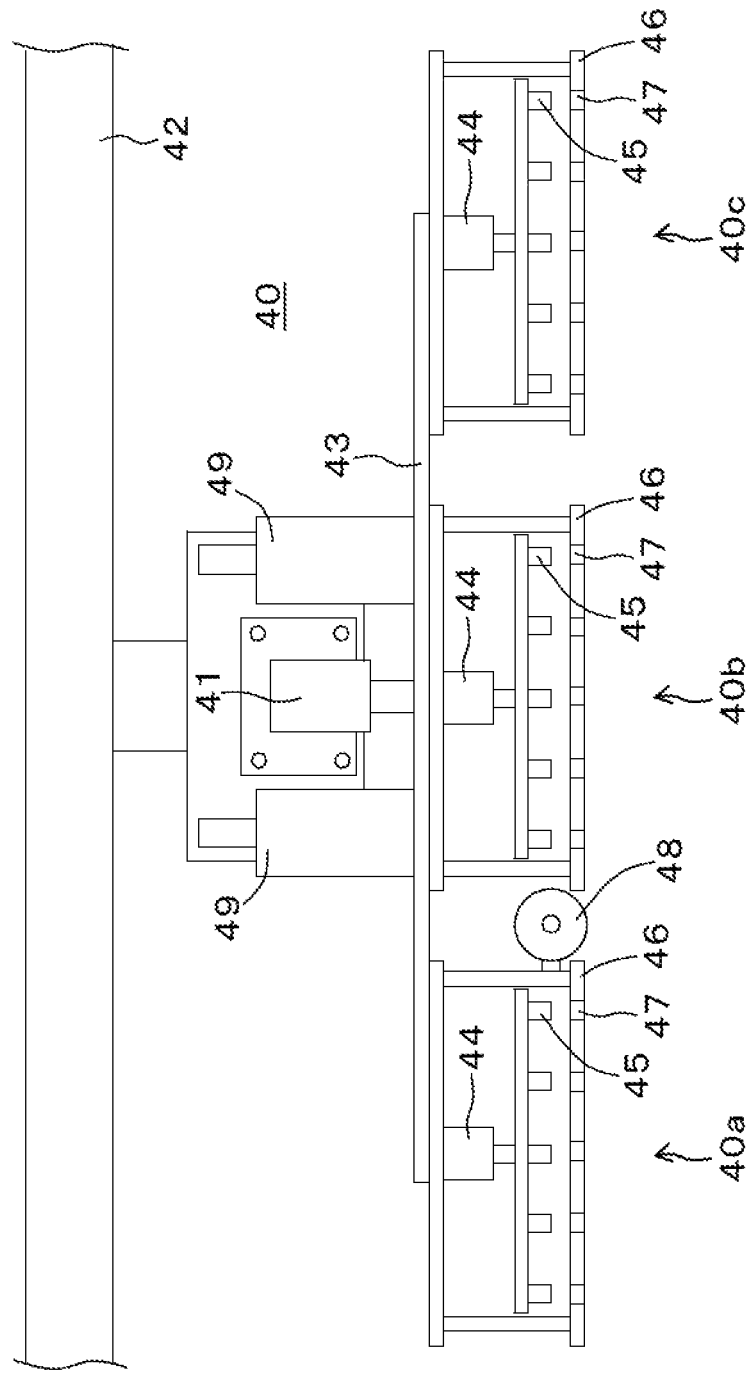
FIG. 6 is a view of a second hand when viewed in the direction indicated by the arrow A of FIG. 3.

As is shown in FIG. 6, each of the hand portions 40a, 40b, and 40c has a same structure as the hand portion 30a of the first hand 30. That is, each of the hand portions 40a, 40b, and 40c has a contact plate 46 fixed to the top plate 43 and provided with multiple magnet holes 47, an air cylinder 44 attached to the top plate 43, and multiple magnets 45 attached to the air cylinder 44.

Owing to this structure, when the contact plate 46 moves down and comes in close proximity to the master roll 8a on the master roll table 10 in association with a movement of the air cylinder 41 and further the magnets 45 move down and sink into the magnet holes 47 of the contact plate 46 in association with a movement of the air cylinder 44, the master roll 8a is attracted to the magnets 45. In this manner, the second hand 40 holds the master roll 8a by forcing the master roll 8a to float above the master roll table 10 by attraction.

When the magnets 45 move up in association with a movement of the air cylinder 44 while the second hand 40 is holding the master roll 8a or the contact plate 46 also moves up in association with a movement of the air cylinder 41 after the magnets 45 move up, the master roll 8a falls off the second hand 40. In this manner, the second hand 40 releases the master roll 8a.

Further, the second hand 40 has a slip detector 48 which detects a slip when the master roll 8a slips on the second hand 40. The slip detector 48 is provided to, for example, a place between the two hand portions 40a and 40b.

Figure 7:
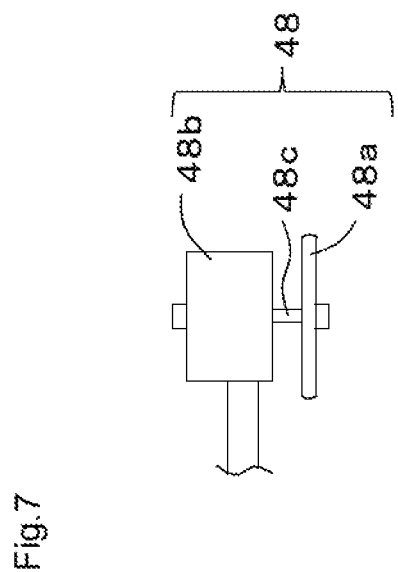
FIG. 7 is a plan view of a slip detector.

As is shown in FIG. 7, the slip detector 48 includes a roller 48a, a rotary encoder 48b, and a shaft 48c functioning as a rotation shaft of the roller 48a and the rotary encoder 48b. The roller 48a is provided to slightly protrude downward from the contact plate 46 of the hand portion 40b.

Owing to this structure, when the second hand 40 holds the master roll 8a, the roller 48a of the slip detector 48 makes contact with the master roll 8a. When the master roll 8a slips on the contact plate 46 of the hand portion 40b, the roller 48a rotates and the rotary encoder 48b detects such a rotation.

Other lifting devices, such as a hydraulic cylinder, may be used instead of the air cylinders 31, 34, 41, and 44. Also, other attracting means capable of attracting the master roll 8a, such as a suction device sucking air in, may be used instead of the magnets 35 and 45. Further, the slip detector 48 may be provided to the first hand 30.

(4) Structure of Belt Table 14

The belt table 14 is a table on which to place a portion of the master roll 8a fed from the master roll table 10, and after the master roll 8a is cut, it is a table on which to place the sheet-like belt 8b cut out from the master roll 8a. It should be noted that when the sheet-like belt 8b is cut out from the master roll 8a, a longitudinal direction of the belt table 14 and the longitudinal direction of the sheet-like belt 8b coincide with each other. Of both sides of the belt table 14 in the longitudinal direction, a portion on a forward side in the feeding direction of the master roll 8a is referred to as a front portion 14a and a portion on the opposite side is referred to as a rear portion 14b.

Figure 8:
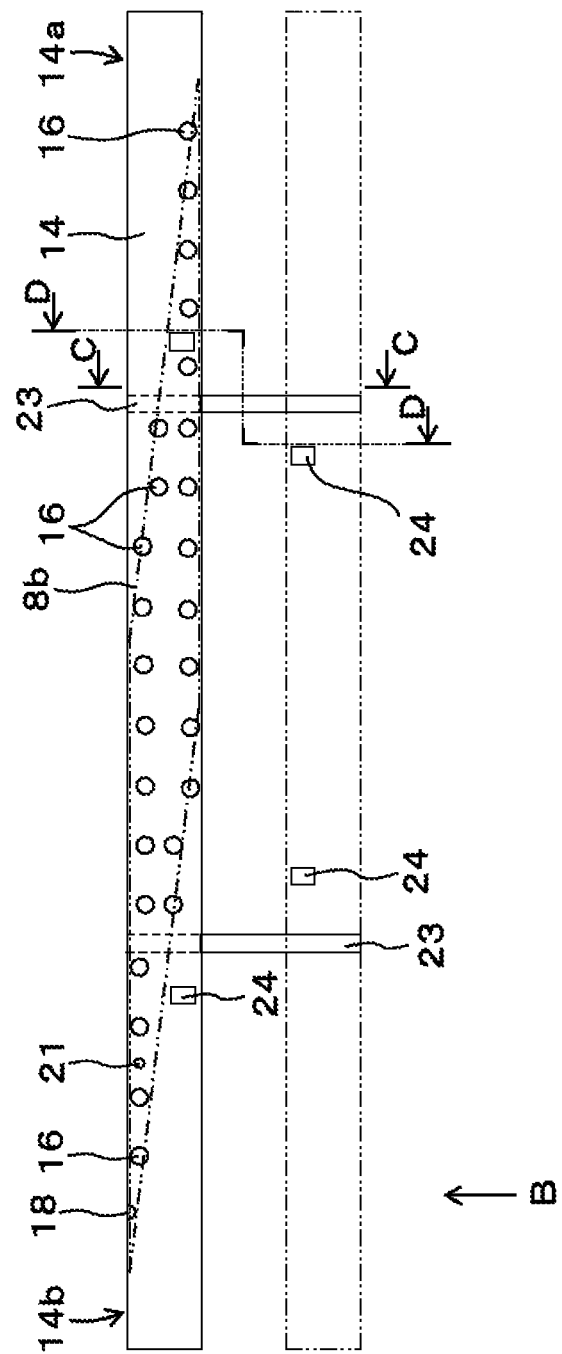
FIG. 8 is a plan view of a belt table.
Figure 9:
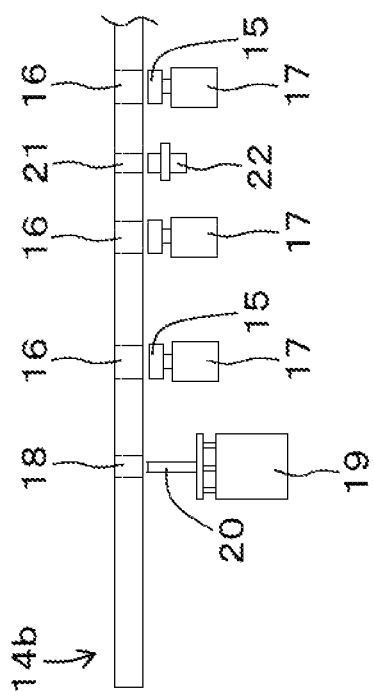
FIG. 9 is a view of a rear portion of the belt table when viewed in a direction indicated by an arrow B of FIG. 8.

As is shown in FIG. 8, multiple magnet holes 16 are lined up in the longitudinal direction of the belt table 14 at least on both sides of the belt table 14 in a width direction. As is shown in FIG. 9, an air cylinder 17 is disposed below each magnet hole 16 and a magnet 15 is attached to each air cylinder 17. In association with a movement of the air cylinder 17, the magnet 15 moves up and goes into the magnet hole 16 or the magnet 15 moves down below the magnet hole 16. When the magnet 15 is in the magnet hole 16, the magnet 15 becomes capable of attracting the master roll 8a and the sheet-like belt 8b on the belt table 14. The magnets 15 can be controlled independently to move up and down. Other attracting means capable of attracting the master roll 8a and the sheet-like belt 8b, such as a suction device sucking air in, may be used instead of the magnets 15.

The rear portion 14b of the belt table 14 is a portion on a winding start side when the sheet-like belt 8b is wound around the winding cylinder 50 described below. A notch 18 is provided to an edge of the rear portion 14b facing the master roll table 10. As is shown in FIG. 9, an air cylinder 19 is disposed below the notch 18 and a push-up rod 20 is attached to the air cylinder 19. In association with a movement of the air cylinder 19, the push-up rod 20 moves up above a top surface of the belt table 14 or moves down below the belt table 14. When the push-up rod 20 moves up above the top surface of the belt table 14, the push-up rod 20 becomes capable of pushing up the sheet-like belt 8b on the belt table 14.

A sensor hole 21 different from the magnet holes 16 opens at another place in the rear portion 14b of the belt table 14. A belt detection sensor 22, such as a nearby sensor, which detects the presence of the sheet-like belt 8b when the sheet-like belt 8b is on the belt table 14, is provided below the sensor hole 21.

The air cylinder 17, the magnets 15, the air cylinder 19, the push-up rod 20, and the belt detection sensor 22 described above are allowed to move with the belt table 14 as one unit owing to a structure described in the following.

(5) Structure Allowing Belt Table 14 to Move

The belt table 14 is allowed to move in a direction orthogonal to the longitudinal direction of the belt table 14 between a belt cut-out position at which the belt table 14 makes contact with or comes in close proximity to the edge 11 of the master roll table 10 and a belt winding position more distant from the master roll table 10 than the belt cut-out position. The belt cut-out position is a position of the belt table 14 when the sheet-like belt 8b is cut out from the master roll 8a. The belt winding position is a position of the belt table 14 when the sheet-like belt 8b is wound around the winding cylinder 50. In FIG. 8, a position of the belt table 14 indicated by a solid line is the belt cut-out position and a position of the belt table 14 indicated by an alternate long and two short dashes line is the belt winding position.

Figure 10:
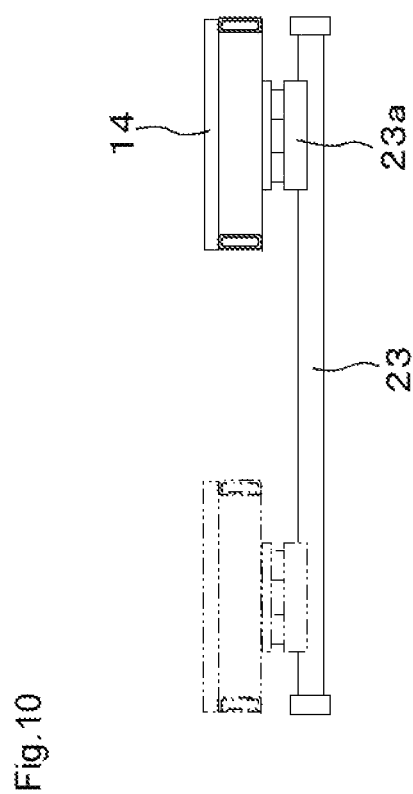
FIG. 10 is a sectional view taken along a line C-C of FIG. 8 (sectional view in the vicinity of a rodless cylinder)

As is shown in FIG. 10, a rodless cylinder 23 as a moving device is provided below the belt table 14 from the belt cut-out position to the belt winding position. A movable portion 23a of the rodless cylinder 23 is allowed to move in a direction orthogonal to the longitudinal direction of the belt table 14. By being fixed to the movable portion 23a, the belt table 14 is allowed to move in a direction orthogonal to the longitudinal direction of the belt table 14. In FIG. 10, the belt table 14 at the belt cut-out position is indicated by a solid line and the belt table 14 at the belt winding position is indicated by an alternate long and two short dashes line.

The rodless cylinder 23 is provided to more than one point (for example, two points) in the longitudinal direction of the belt table 14. By controlling the movable portions 23a of the respective rodless cylinders 23 to move in synchronization, the belt table 14 moves parallel to itself while keeping its posture. As is shown in FIG. 8, the belt table 14 at the belt cut-out position and the belt table 14 at the belt winding position are parallel to each other.

Figure 11:
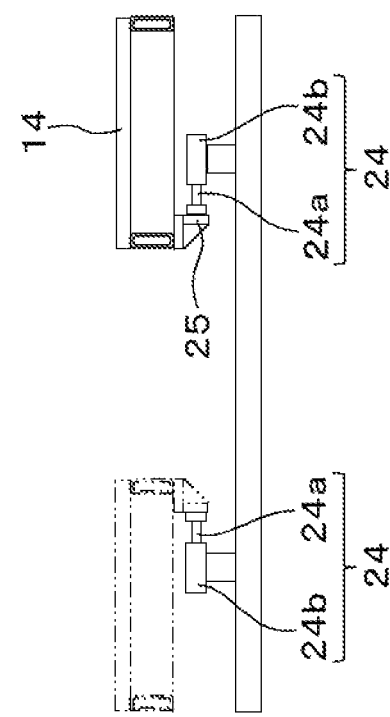
FIG. 11 is a sectional view taken along a line D-D of FIG. 8 (sectional view in the vicinity of a buffer device)

As is shown in FIG. 11, a buffer device 24 is fixed at each of the belt cut-out position and the belt winding position to ease an impact given when the belt table 14 moves to the respective positions. The buffer device 24 has, for example, a rod 24a and a case 24b. When an impact in a direction pushing the rod 24a is applied, the impact is eased by an internal structure of the case 24b. The rod 24a of the buffer device 24 at the belt cut-out position protrudes toward the belt winding position and the rod 24a of the buffer device 24 at the belt winding position protrudes toward the belt cut-out position. In FIG. 11, the belt table 14 at the belt cut-out position is indicated by a solid line and the belt table 14 at the belt winding position is indicated by an alternate long and two short dashes line.

As is shown in FIG. 8, the buffer devices 24 as above are provided at multiple positions in the longitudinal direction of the belt table 14. The buffer devices 24 are fixed below the belt table 14.

Stoppers 25 protruding downward are fixed to the belt table 14 at positions in the longitudinal direction corresponding to the respective buffer devices 24. Hence, when the belt table 14 moves to the belt cut-out position or the belt winding position, the stopper 25 of the belt table 14 hits the buffer device 24 at the moved position, by which an impact is eased. The buffer devices 24 function also as a stopping device to stop the belt table 14 at a predetermined position.

(6) Structure of Cutting Device 70 and Structure to Cut Master Roll 8a

Figure 12:
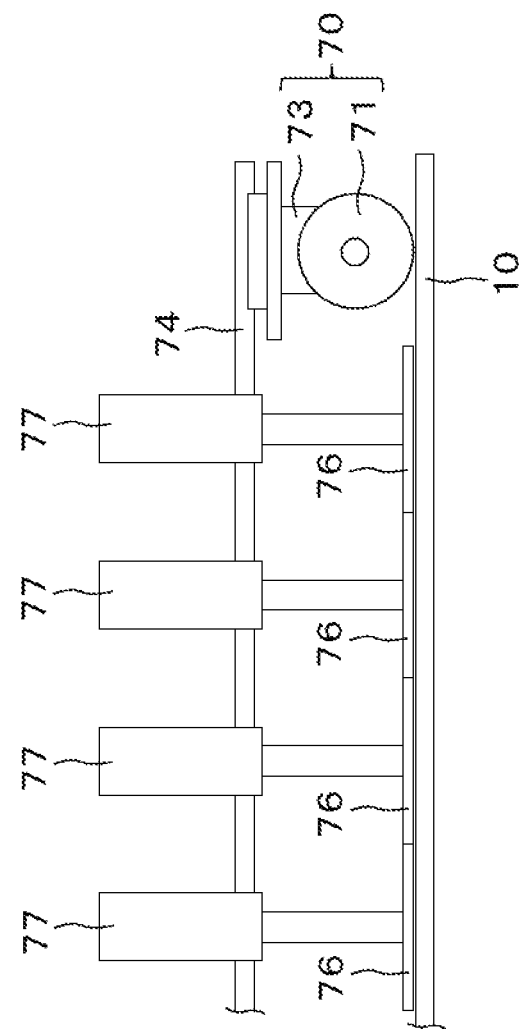
FIG. 12 is a view of a cutting device and pressing members when viewed in the direction indicated by the arrow A of FIG. 3.

As is shown in FIG. 12, the cutting device 70 has a circular blade 71 which cuts the master roll 8a and a device main body 73 which holds the blade 71. Also, an unillustrated long lower blade is provided between the master roll table 10 and the belt table 14 along the edge 11 of the master roll table 10. The blade 71 and the device main body 73 move along a rail 74 provided above the belt table 14 in the longitudinal direction of the belt table 14, which is a cutting direction of the master roll 8a. While moving, the blade 71 rotates by running in contact with the long lower blade and thereby cuts the master roll 8a. The sheet-like belt 8b is thus cut out on the belt table 14.

Above the edge 11 of the master roll table 10 facing the belt table 14, multiple pressing members 76 are lined up along the edge 11. Each pressing member 76 is a plate-shaped member having a bottom surface parallel to the top surface of the master roll table 10 and independently moved up and down by an air cylinder 77. When the pressing members 76 move down, the pressing members 76 press the master roll 8a against the master roll table 10 at positions along the edge 11.

When the master roll 8a is cut by the cutting device 70, the multiple pressing members 76 press the master roll 8a in a portion closer to the master roll table 10 than the cutting position while the multiple magnets 15 attract the master roll 8a in a portion closer to the belt table 14 than the cutting position.

(7) Structure of Winding Cylinder 50

Figure 13A:
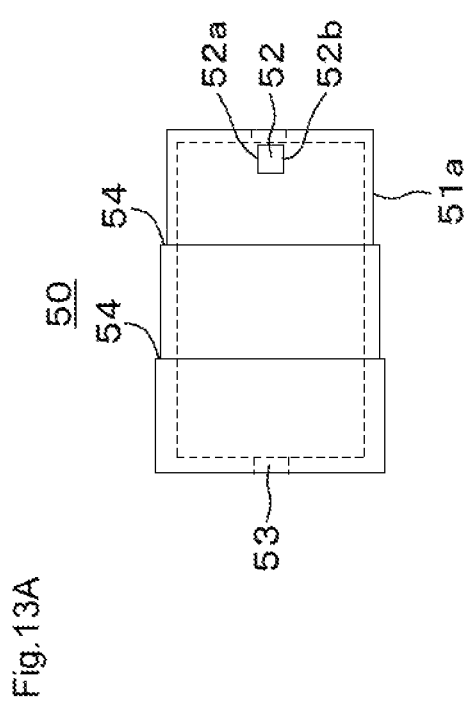
FIG. 13A is a view of a winding cylinder when viewed from radially outside and FIG. 13B is a view of the winding cylinder when viewed in an axial direction.
Figure 13B:
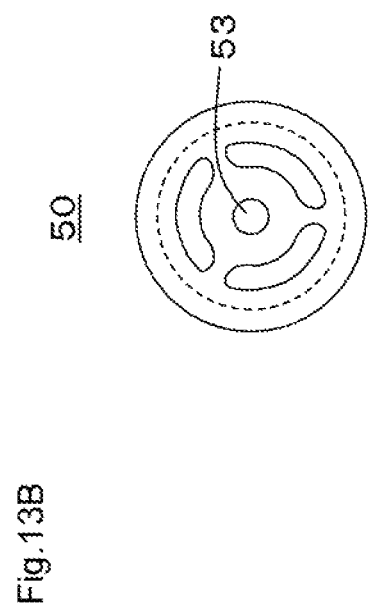

As is shown in FIG. 13, radial differences are given to an outside surface of the winding cylinder 50 by providing steps 54 to make the diameter smaller on one side and larger on the other side in the axial direction. A height of the steps 54 is equal to a thickness of the sheet-like belt 8b wound around the winding cylinder 50.

The number of the steps 54 is determined as follows. That is, as is shown in FIG. 2B, the sheet-like belt 8b has inclined regions 7b, which are tapered regions having the inclined side portions 7a, and a maximum width region 7c which is a region having a maximum width without having the inclined side portion 7a. The inclined regions 7b are on both sides of the sheet-like belt 8b in the longitudinal direction. The number of the steps 54 is a value found by subtracting one from the number of rotations (integer by rounding off to the closest whole number) necessary for the winding cylinder 50 to wind one entire inclined region 7b completely. By determining the number of the steps 54 as above, as many surfaces having different radial differences as the number of rotations (integer by rounding off to the closest whole number) necessary for the winding cylinder 50 to wind one entire inclined region 7b completely are provided to the winding cylinder 50.

A manner in which the sheet-like belt 8b is wound around the winding cylinder 50 as above will be described below.

A belt tip insertion hole 52 opens in a small-diameter portion 51a of the winding cylinder 50. The belt tip insertion hole 52 is a hole in which to insert a tip end of the sheet-like belt 8b when winding of the sheet-like belt 8b around the winding cylinder 50 starts. A desirable shape of the belt tip insertion hole 52 is, as is shown in FIG. 13A, a shape in which both sides in a circumferential direction of the winding cylinder 50 form sides 52a and 52b extending in the axial direction of the winding cylinder 50. Also, a rotation shaft hole 53 in which to insert a rotation shaft 81 of a winding device 80 and a rotation shaft 61 of the laminating device 60, both of which will be described below, opens in the winding cylinder 50 at a position of a rotation shaft.

The winding cylinder 50 is made of, for example, resin, and examples of the resin include but not limited to ABS resin and nylon. In addition, the winding cylinder 50 is hollow.

As a modification of the winding cylinder 50 as above, a winding cylinder 150 having an outside surface formed of a single stepless curved surface as is shown in FIG. 14 may be used to wind the sheet-like belt 8b. It is desirable that a belt tip insertion hole 52 same as the one described above also opens in the winding cylinder 150 of the modification.

(8) Structure to Wind Sheet-Like Belt 8b Around Winding Cylinder 50

Figure 16:
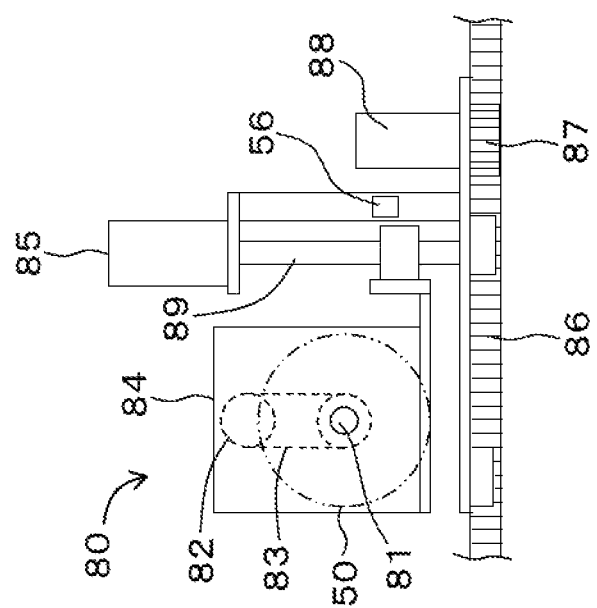
FIG. 16 is a view of the winding device when viewed in a direction indicated by an arrow E of FIG. 15.

The winding cylinder 50 is attached to the winding device 80 shown in FIG. 15 and FIG. 16. The winding device 80 has a rotary drive portion 84 formed of the rotation shaft 81 inserted into the rotation shaft hole 53 of the winding cylinder 50, a servo motor 82 rotating the rotation shaft 81, and a timing belt 83 coupling pullies respectively fixed to the rotation shaft 81 and a rotor of the servo motor 82. When the servo motor 82 operates, its power is transmitted to the rotation shaft 81 by the timing belt 83 and the winding cylinder 50 rotates with the rotation shaft 81 as one unit.

The rotation shaft 81 extends parallel to the top surface of the belt table 14 in a direction orthogonal to the longitudinal direction of the belt table 14. When the winding cylinder 50 is attached to the rotation shaft 81, a direction of the rotation shaft of the winding cylinder 50 also becomes parallel to the top surface of the belt table 14 in a direction orthogonal to the longitudinal direction of the belt table 14. Hence, when the longitudinal direction of the belt table 14 and the longitudinal direction of the sheet-like belt 8b placed thereon coincide with each other, a circumferential direction (that is, the rotation direction) of the winding cylinder 50 and the longitudinal direction of the sheet-like belt 8b wound around the winding cylinder 50 coincide with each other.

Figure 17:
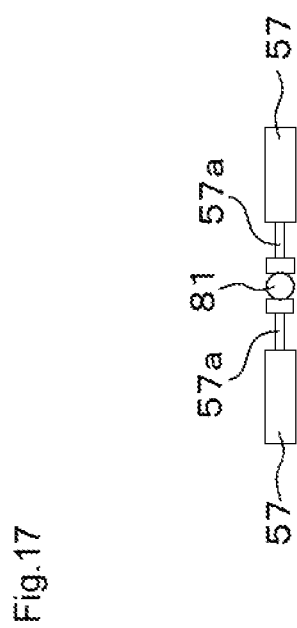
FIG. 17 is a view of a holding structure of a rotation shaft of the winding device (when viewed in the direction indicated by the arrow E of FIG. 15)

As is shown in FIG. 17, the rotation shaft 81 is held by air cylinders 57 from both sides in a front-rear direction, which is a moving direction of the winding cylinder 50. A constant pressure is applied to piston rods 57a of the respective air cylinders 57 toward the rotation shaft 81. Owing to this structure, when a force larger than a predetermined magnitude is applied to the winding cylinder 50 attached to the rotation shaft 81 in the front-rear direction, the piston rods 57a undergo displacement and the rotation shaft 81 shifts in the front-rear direction, by which the force applied to the winding cylinder 50 is released. In FIG. 15 and FIG. 16, the air cylinders 57 are not shown.

The winding device 80 also has a ball screw 89 causing the rotary drive portion 84 to move up and down, and a servo motor 85 driving the ball screw 89. When the servo motor 85 operates, the rotary drive portion 84 coupled to a nut of the ball screw 89 moves up and down.

Further, the winding device 80 has a moving device moving the servo motor 85 and the rotary drive portion 84 as one unit in the longitudinal direction of the belt table 14. The moving device of the winding device 80 has a rack 86 extending in the longitudinal direction of the belt table 14 next to the belt table 14 at the belt winding position, a pinion 87 meshed with the rack 86, and a servo motor 88 rotating the pinion 87. The servo motor 88 moves with the servo motor 85 and the rotary drive portion 84 as one unit along the rack 86 while rotating the pinon 87. Consequently, the winding cylinder 50 attached to the rotation shaft 81 of the rotary drive portion 84 moves along the rack 86 in the longitudinal direction of the belt table 14. The rack 86 is parallel to the belt table 14 at a high degree of accuracy.

The winding cylinder 50 attached to the winding device 80 stands by at a waiting position which is a position close to the front portion 14a of the belt table 14. When the belt table 14 carrying the sheet-like belt 8b moves to the belt winding position, the servo motor 88 starts to operate. Accordingly, the winding cylinder 50 moves in the longitudinal direction of the belt table 14 to the winding start position close to the rear portion 14b of the belt table 14. In a case where the sheet-like belt 8b is wound around the winding cylinder 50, the servo motor 82 and the servo motor 88 start to operate, by which the winding cylinder 50 winds up the sheet-like belt 8b by moving from the winding start position to the waiting position while rotating.

A laser displacement sensor 56 is fixed to the winding device 80 to protrude in a same direction as the rotation shaft 81. The laser displacement sensor 56 is allowed to move with the winding cylinder 50 as one unit in the longitudinal direction of the belt table 14, and passes above the sheet-like belt 8b on the belt table 14 while moving. The laser displacement sensor 56 detects both ends of the sheet-like belt 8b in the longitudinal direction (to be more exact, steps between a surface of the belt table 14 and a surface of the sheet-like belt 8b) while passing above the sheet-like belt 8b. A control portion 90 is capable of finding a length of the sheet-like belt 8b from a travel distance of the rotary drive portion 84 since the laser displacement sensor 56 detects one end of the sheet-like belt 8b in the longitudinal direction until the laser displacement sensor 56 detects the other end. Hence, the laser displacement sensor 56 functions as a measuring device measuring a length of the sheet-like belt 8b on the belt table 14. It is desirable that the laser displacement sensor 56 is set to detect a position of the sheet-like belt 8b at a center in the width direction. Alternatively, another measuring device capable of measuring a length of the sheet-like member 8b on the belt table 14 may be used instead of the laser displacement sensor 56.

At the waiting position, a worker attaches the winding cylinder 50 to the winding device 80 and removes the winding cylinder 50 from the winding device 80 when winding of the sheet-like belt 8b ends. Hence, the worker can work while standing at the waiting position.

(9) Structures of Laminating Device 60 and Molding Drum 64

Figure 18:
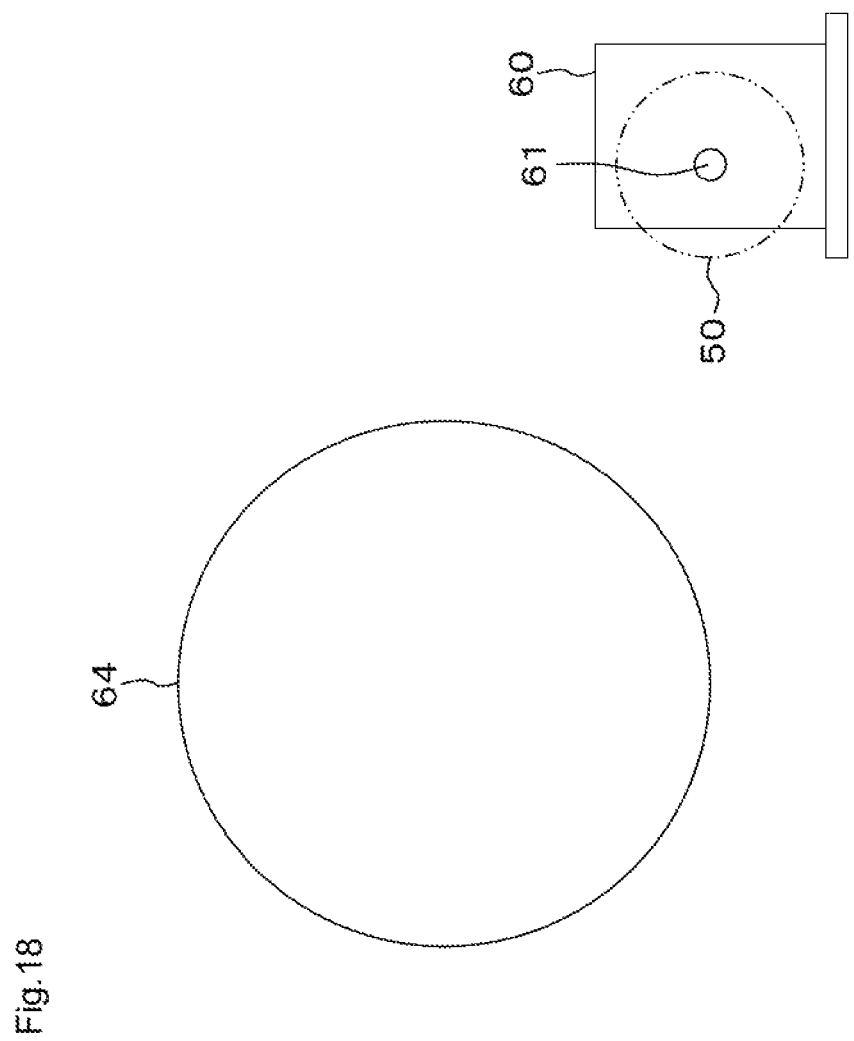
FIG. 18 is a view of a laminating device and a molding drum when viewed in a direction indicated by an arrow F of FIG. 3.

The laminating device 60 and the molding drum 64 shown in FIG. 18 are devices to unwind the sheet-like belt 8*b* from the winding cylinder 50 and molding the sheet-like belt 8*b* into the circular belt 8*c*.

The laminating device 60 is a device to which the winding cylinder 50 is attached when the sheet-like belt 8*b* is unwound from the winding cylinder 50. The laminating device 60 has the rotatable rotation shaft 61. By inserting the rotation shaft 61 into the rotation shaft hole 53 of the winding cylinder 50, the winding cylinder 50 is attached to the laminating device 60. The winding cylinder 50 attached to the laminating device 60 is rotatable.

The molding drum 64 is a device molding the cylindrical belt 8*c* and disposed to oppose the rotation shaft 61 of the laminating device 60. The molding drum 64 is of a cylindrical shape and its rotation shaft is parallel to the rotation shaft 61 of the laminating device 60. The molding drum 64 is connected to an unillustrated drive device. When the drive device operates, the molding drum 64 rotates. When the molding drum 64 rotates and starts to wind up the sheet-like belt 8*b* from the winding cylinder 50, the winding cylinder 50 is driven and starts to feed the sheet-like belt 8*b*.

The laminating device 60 and the molding drum 64 may be disposed at a place distant from the master roll table 10, the belt table 14, and the winding device 80.

(10) Structure to Control Manufacturing Device

Figure 19:
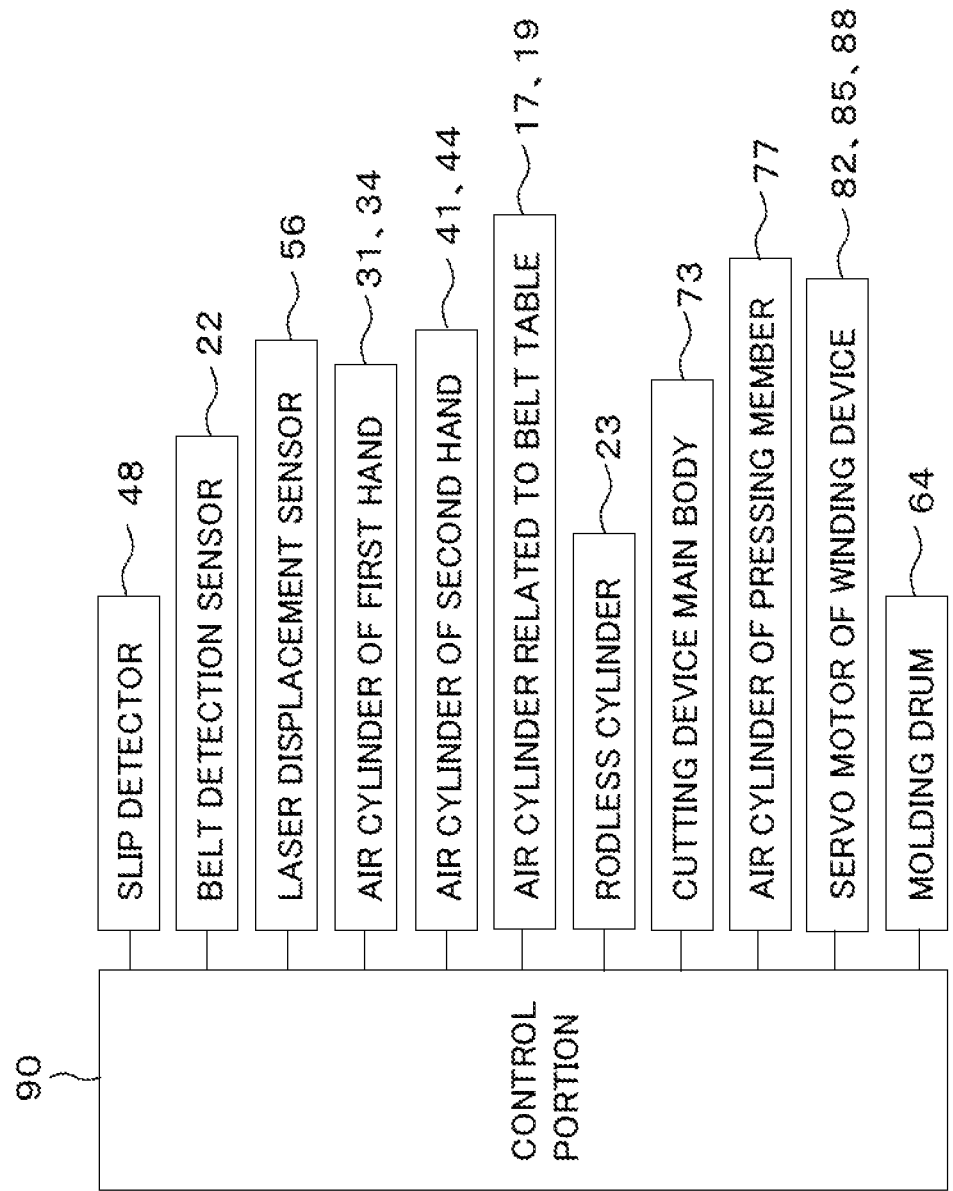
FIG. 19 is a block diagram centered around a control portion.

The manufacturing device of a tire belt as above is controlled by the control portion 90 shown in FIG. 19. The control portion 90 is electrically connected to respective portions enabling the manufacturing device to operate and capable of controlling the respective portions. Further, the control portion 90 is electrically connected to at least the slip detector 48, the belt detection sensor 22, and the laser displacement sensor 56 and is capable of controlling the respective portions according to detection results of at least these sensors. FIG. 19 shows some of the portions electrically connected to the control portion 90. A manufacturing method of a tire belt described in the following can be performed under the control of the control portion 90.

3. Manufacturing Method of Tire Belt

Herein, a manufacturing method of a tire belt, that is, the cylindrical belt 8*c* used in the pneumatic tire 1 will be described. A description is given on the assumption that the manufacturing device of a tire belt described above is used for the manufacturing method.

(1) Feeding of Master Roll 8*a*

Firstly, the master roll 8*a* is placed on the master roll table 10. It is understood that a front end of the master roll 8*a* in the feeding direction is along the edge 11 of the master roll table 10 and inclines with respect to the longitudinal direction of the master roll 8*a* before feeding of the master roll 8*a* described in the following starts.

Subsequently, the first hand 30 and the second hand 40 feed the master roll 8*a* placed on the master roll table 10 to the belt table 14 at the belt cut-out position. This feeding is performed by repeating feeding of a short distance and stopping of the feeding multiple times.

That is, the first hand 30 holds the front part of the master roll 8*a* and the second hand 40 holds the rear part of the master roll 8*a*. Because the first hand 30 and the second hand 40 attract the master roll 8*a* by using the magnets 35 and 45, respectively, the master roll 8*a* floats above the master roll table 10.

Figure 20A:
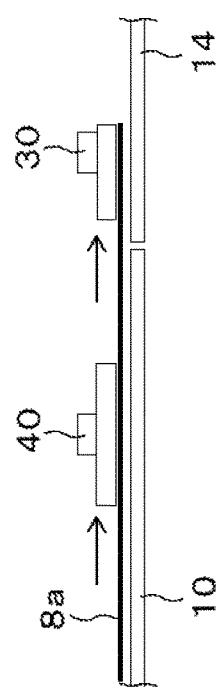
FIGS. 20A to 20D are views showing a manner in which the master roll is fed from the master roll table to the belt table with arrows indicating a hand moving direction, FIG. 20A being a view showing a manner in which the first hand and the second hand move in the feeding direction by a short distance, FIG. 20B being a view showing a manner in which the second hand releases the master roll and moves backward in the feeding direction, FIG. 20C being a view showing a manner in which the second hand holds the master roll again, and FIG. 20D being a view showing a manner in which the first hand and the second hand move again in the feeding direction by a short distance.
Figure 20B:
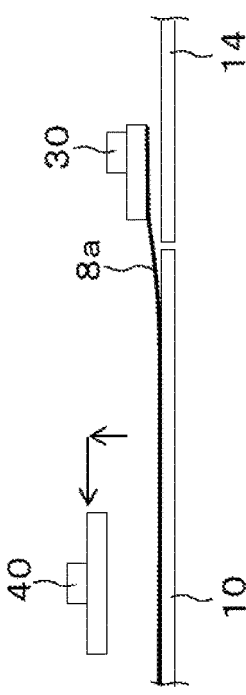
Figure 20C:
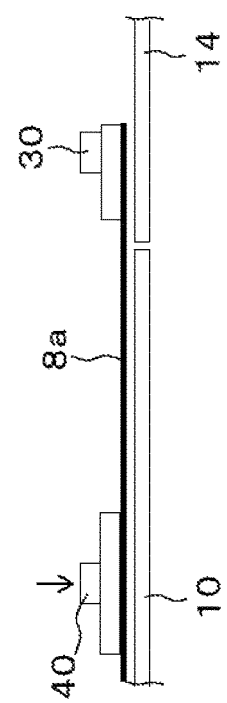
Figure 20D:
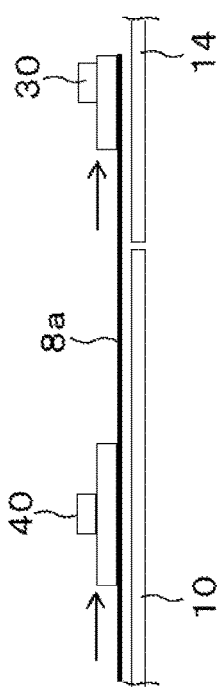

Subsequently, the first hand 30 and the second hand 40 move in the feeding direction by a short distance simultaneously at a same speed as is shown in FIG. 20A, by which the master roll 8*a* is fed by a short distance. Subsequently, the first hand 30 and the second hand 40 stop. Subsequently, while the first hand 30 is at rest while holding the master roll 8*a*, the second hand 40 releases the master roll 8*a* and moves backward in the feeding direction as is shown in FIG. 20B, and holds the master roll 8*a* again as is shown in FIG. 20C. Subsequently, the first hand 30 and the second hand 40 move again in the feeding direction by a short distance simultaneously at a same speed as is shown in FIG. 20D, by which the master roll 8*a* is fed by a short distance.

As the first hand 30 and the second hand 40 repeat the movements as above, a range forming a single sheet-like belt 8*b* in the master roll 8*a* on a forward side in the feeding direction is fed to the belt table 14. The feeding ends when the range forming a single sheet-like belt 8*b* is placed on the belt table 14. The first hand 30 keeps holding the front part of the master roll 8*a* from start to end of the feeding as above.

While the master roll 8*a* is moving, the air supply device operates and air blows out upward from the blow holes 12 of the master roll table 10. This air induces a floating force that acts on the master roll 8*a* on the master roll table 10.

In a case where a force pulling the master roll 8*a* backward in the feeding direction acts on the master roll 8*a* by, for example, a trouble, while the first hand 30 and the second hand 40 are holding the master roll 8*a*, the master roll 8*a* may possibly slip on the first hand 30 and the second hand 40. In a case where the master roll 8*a* slips as above, the roller 48*a* of the slip detector 48 rotates as is shown in FIG. 21A and the slip is detected. Accordingly, the control portion 90 gives an alarm or stops the feeding of the master roll 8*a*.

In a case where the slip detector 48 is provided to the first hand 30, a slip can be detected even when the master roll 8*a* slips while the first hand 30 alone is holding the master roll 8*a*.

The master roll 8*a* in part may possibly float above the master roll table 10 when the tension becomes loose. In such a case, as is shown in FIG. 21B, the roller 48*a* of the slip detector 48 rotates by making contact with a floating portion of the master roll 8*a* while the secondhand 40 is moving backward in the feeding direction after the second hand 40 releases the master roll 8*a* during the feeding of the master roll 8*a*. In this manner, the slip detector 48 detects that the master roll 8*a* is floating. Accordingly, the control portion 90 gives an alarm or stops the feeding of the master roll 8*a*.

When the feeding of the master roll 8*a* to the belt table 14 ends, the first hand 30 and the second hand 40 release the master roll 8*a*. At the same time, the magnets 15 of the belt table 14 move up and attract both sides of the master roll 8*a* in the width direction onto the belt table 14.

(2) Cutting-Out of Sheet-Like Belt 8*b* and Movement to Belt Winding Position When a range forming a single sheet-like belt 8*b* in the master roll 8*a* is fed to the belt table 14, a single sheet-like belt 8*b* is cut out by cutting the master roll 8*a* once. This single sheet-like belt 8*b* is a sheet-like belt 8*b* for one full circle of tire.

Figure 22A:
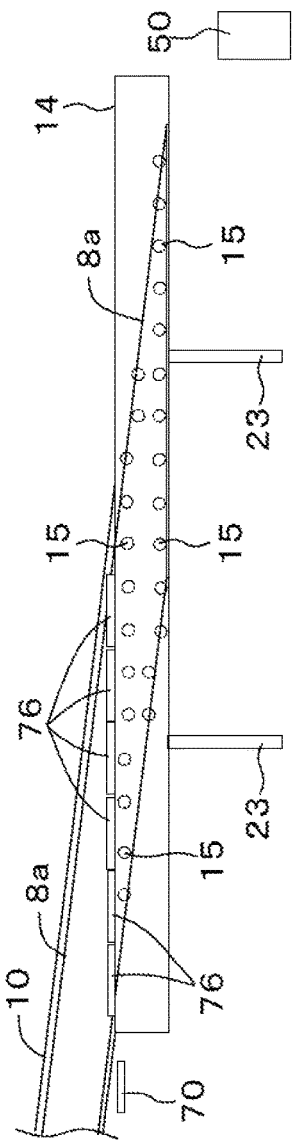
FIGS. 22A to 22C are views showing a manner in which the sheet-like belt is cut out and moved to a belt winding position with arrows indicating moving directions of the cutting device and the belt table, FIG. 22A being a view showing a manner in which the master roll is fixed, FIG. 22B being a view showing a manner in which the master roll is cut, and FIG. 22C being a view showing a manner in which the belt table moves.

In order to cut the master roll 8*a*, the multiple pressing members 76 move down from above the edge 11 of the master roll table 10 facing the belt table 14 first, and as is shown in FIG. 22A, press the master roll 8*a* in a portion closer to the master roll table 10 than the cutting position. Consequently, the master roll 8*a* is fixed so as not to shift by the multiple pressing members 76 on the side closer to the master roll table 10 than the cutting position and by the multiple magnets 15 on the side closer to the belt table 14 than the cutting position.

Figure 22B:
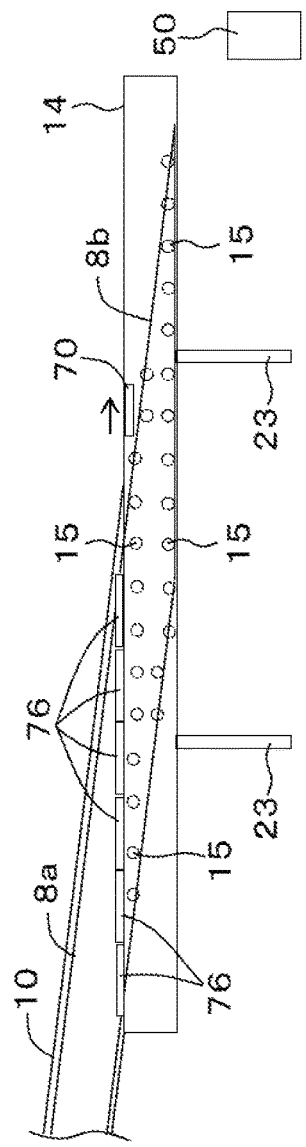

Subsequently, as is shown in FIG. 22B, the cutting device 70 cuts the master roll 8a between the master roll table 10 and the belt table 14 while the master roll 8a is fixed by the pressing members 76 and the magnets 15. The master roll 8a is cut along the edge 11 of the master roll table 10 in the longitudinal direction of the belt table 14. Consequently, a portion of the master roll 8a placed on the belt table 14 is cut out as a single sheet-like belt 8b for one full circle of tire.

Figure 22C:
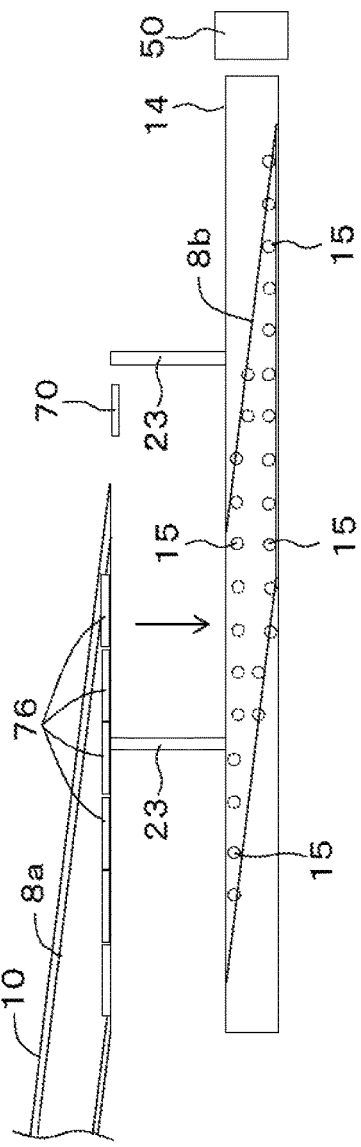

Subsequently, as is shown in FIG. 22C, in association with a movement of the rodless cylinders 23, the belt table 14 moves from the belt cut-out position to the belt winding position while carrying the single sheet-like belt 8b. The belt table 14 moves while the cut-out single sheet-like belt 8b is fixed by attracting the cut-out single sheet-like belt 8b onto the belt table 14 by the magnets 15. Hence, the magnets 15 keep attracting the master roll 8a or the sheet-like belt 8b onto the belt table 14 continuously before the master roll 8a is cut. When the belt table 14 arrives the belt winding position, an impact applied to the belt table 14 is eased by the buffer device 24 described above.

(3) Length Measurement of Sheet-Like Belt 8b

When the belt table 14 carrying the sheet-like belt 8b has moved to the belt winding position, as is shown in FIG. 23A, the winding device 80 to which is attached the winding cylinder 50 is at the waiting position. The winding device 80 starts to wind the sheet-like belt 8b around the winding cylinder 50 after the belt table 14 moves to the belt winding position. Hence, the winding device 80 moves from the waiting position to the winding start position to start winding of the sheet-like belt 8b around the winding cylinder 50. During this movement, the winding cylinder 50 is floating above the belt table 14 and the sheet-like belt 8b.

During the movement shown in FIG. 23B, the laser displacement sensor 56 fixed to the winding device 80 measures a length of the sheet-like belt 8b by passing above the sheet-like belt 8b on the belt table 14. It is desirable to measure a length on a straight line at a center of the sheet-like belt 8b in the width direction.

When the laser displacement sensor 56 ends the measurement of a length of the sheet-like belt 8b, the control portion 90 makes a pass or fail determination as to the length of the sheet-like belt 8b. For example, when the measured length of the sheet-like belt 8b falls within a tolerance range (for example, ±20 mm) of a standard dimension, the control portion 90 makes a pass determination, and a fail determination when the measured length falls outside the range.

The winding device 80 moves to the winding start position and stops once. In a case where the control portion 90 makes a pass determination as to the length of the sheet-like belt 8b, winding of the sheet-like belt 8b around the winding cylinder 50 described in the following is started. Meanwhile, in a case where the control portion 90 makes a fail determination, the winding device 80 stays at the winding start position and generation of a failed product is notified.

It should be noted that even after the belt table 14 moves to the belt winding position, the magnets 15 continuously fix the sheet-like belt 8b onto the belt table 14 by attraction until attraction is cancelled as will be described in the following.

(4) Winding of Sheet-Like Belt 8b

Figure 24A:
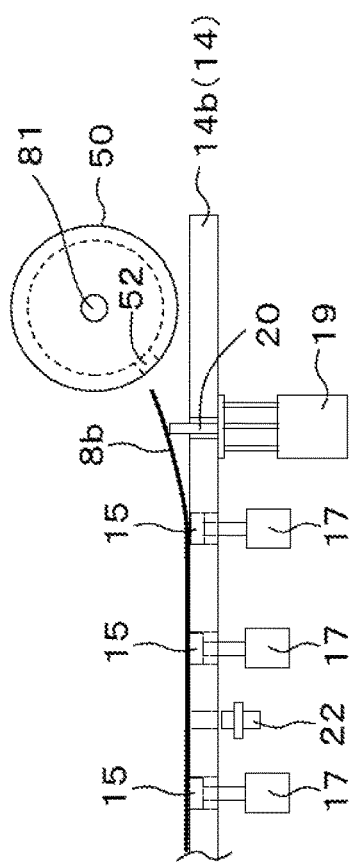
FIGS. 24A to 24C are views showing a manner in which the sheet-like belt is wound with arrows indicating a rotation direction and a moving direction of the winding cylinder, FIG. 24A being a view showing a manner in which a winding start tip of the sheet-like belt is pushed up, FIG. 24B being a view showing a manner in which the winding start tip of the sheet-like belt is inserted into a belt tip insertion hole of the winding cylinder, and FIG. 24C being a view showing a manner in which the winding cylinder moves by rotating.

In a case where the winding cylinder 50 attached to the winding device 80 moves to the winding start position and a pass determination is made as to the length of the sheet-like belt 8b, firstly, as is shown in FIG. 24A, the push-up rod 20 moves up from below the belt table 14 and pushes up an end of the inclined region 7b of the sheet-like belt 8b on the side where the winding starts (referred to as "winding start tip").

Figure 24B:
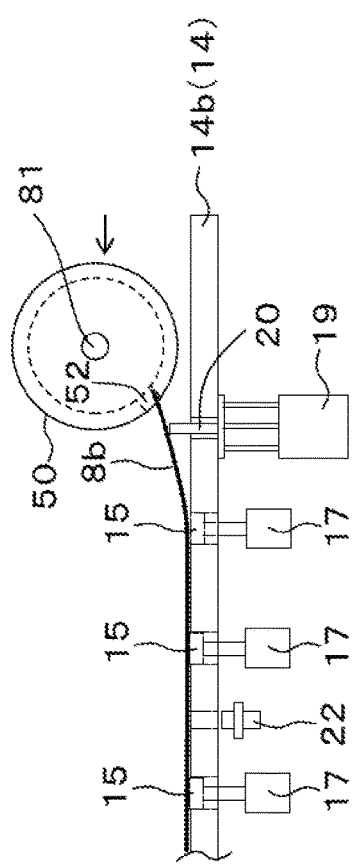

Subsequently, as is shown in FIG. 24B, the winding start tip of the sheet-like belt 8b is inserted into the belt tip insertion hole 52 of the winding cylinder 50 as the winding cylinder 50 moves forward toward the waiting position by a short distance. Consequently, the winding start tip of the sheet-like belt 8b can be substantially fixed to the winding cylinder 50 and winding of the sheet-like belt 8b around the winding cylinder 50 can be started.

Figure 24C:
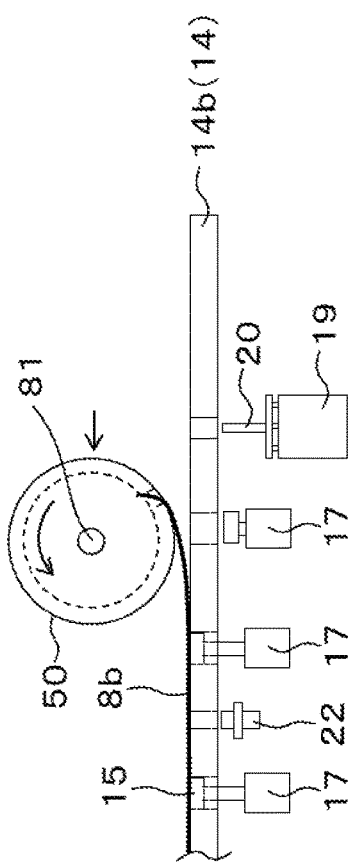

Subsequently, as is shown in FIG. 24C, the winding cylinder 50 moves in the longitudinal direction of the belt table 14 (that is, the longitudinal direction of the sheet-like belt 8b) by rotating about the rotation shaft 81 of the winding device 80, by which the winding cylinder 50 winds up the sheet-like belt 8b. During this winding, the winding cylinder 50 moves from the winding start position toward the waiting position. The winding cylinder 50 moves while floating above the belt table 14 and winds up the sheet-like belt 8b upward. At the beginning, the sheet-like belt 8b is attracted onto the belt table 14 by the multiple magnets 15 lined up in the longitudinal direction and eventually attraction by the magnets 15 is cancelled one after another from the magnet 15 to which the winding cylinder 50 has moved (to be more specific, as the magnets 15 move down one after another). Consequently, the sheet-like belt 8b comes off the belt table 14 from one portion to another where attraction is cancelled and is wound around the winding cylinder 50.

The sheet-like belt 8b is wound around the winding cylinder 50 in multiple turns. As the winding progresses, a winding diameter increases by a thickness of the sheet-like belt 8b wound around earlier. Hence, the control portion 90 prevents the sheet-like belt 8b on the belt table 14 from being pulled hard by the winding cylinder 50 by reducing an angular velocity of a rotation of the winding cylinder 50 or increasing a moving speed of the winding cylinder 50 as the winding progresses.

When the winding cylinder 50 arrives a position of an end of the inclined region 7b in the sheet-like belt 8b on the side where the winding ends (referred to as "winding end tip"), the winding cylinder 50 which has been floating above the belt table 14 moves down as is shown in FIG. 25 and is pressed against the winding end tip of the sheet-like belt 8b. Consequently, the winding end tip of the sheet-like belt 8b firmly adheres to the winding cylinder 50 and the winding of the sheet-like belt 8b around the winding cylinder 50 ends.

In a case where insertion of the winding start tip of the sheet-like belt 8b into the belt tip insertion hole 52 fails, the winding start tip of the sheet-like belt 8b remains on the belt table 14 even when the winding cylinder 50 starts to move toward the waiting position by rotating. Accordingly, in a case where the belt detection sensor 22 detects the presence of the winding start tip of the sheet-like belt 8b on the belt table 14 when the winding cylinder 50 has moved to a predetermined position, a failure in insertion of the winding start tip of the sheet-like belt 8b into the belt tip insertion hole 52 can be determined. Accordingly, the control portion 90 stops a movement of the winding cylinder 50 and notifies the occurrence of an error.

(5) Specific Manner to Wind Sheet-Like Belt 8b Around Winding Cylinder 50

A specific manner in which the sheet-like belt 8b is wound around the winding cylinder 50 will be described by using FIG. 26. Described herein as an example is a case where the winding cylinder 50 is provided with the two steps 54 and therefore has the small-diameter portion 51a formed on one side in the axial direction, a large-diameter portion 51c formed on the other side in the axial direction, and an intermediate-diameter portion 5ib having a diameter which is an intermediate diameter between the diameters of the small-diameter portion 51*a* and the large-diameter portion 51*c*. The small-diameter portion 51*a* is a portion where the winding of the sheet-like belt 8*b* starts.

Firstly, the winding cylinder 50 is rotated as many times as a sum of the number of the steps 54 provided to the winding cylinder 50 and one (that is, the number of surfaces having different diameters) to completely wind the entire inclined region 7*b* of the sheet-like belt 8*b* at the winding start tip.

Figure 26A:
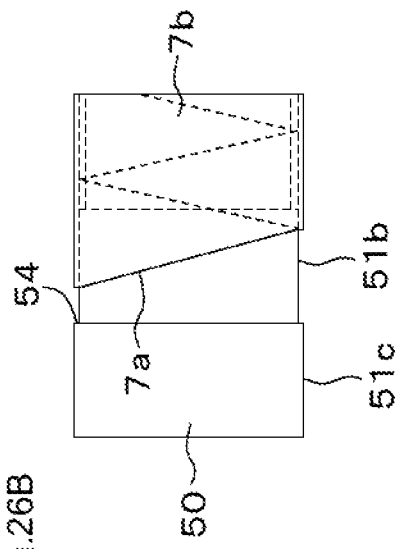
FIGS. 26A to 26D are views showing a manner in which the sheet-like belt is wound around the winding cylinder, FIG. 26A being a view showing a manner in which the sheet-like belt is wound by a first turn, FIG. 26B being a view showing a manner in which the sheet-like belt is wound by a second turn.

More specifically, as is shown in FIG. 26A, a narrow portion near the winding start tip in the inclined region 7*b* of the sheet-like belt 8*b* is wound around the small-diameter portion 51*a* of the winding cylinder 50 in a first turn of the winding. An outer diameter of the sheet-like belt 8*b* wound around the small-diameter portion 51*a* is equal to an outer diameter of the intermediate-diameter portion 51*b*.

In second and subsequent turns of the winding of the inclined region 7*b* of the sheet-like belt 8*b* at the winding start tip, the sheet-like belt 8*b* is wound over a portion including the sheet-like belt 8*b* wound earlier around the winding cylinder 50 and a portion of the winding cylinder 50 having a larger diameter.

Figure 26B:
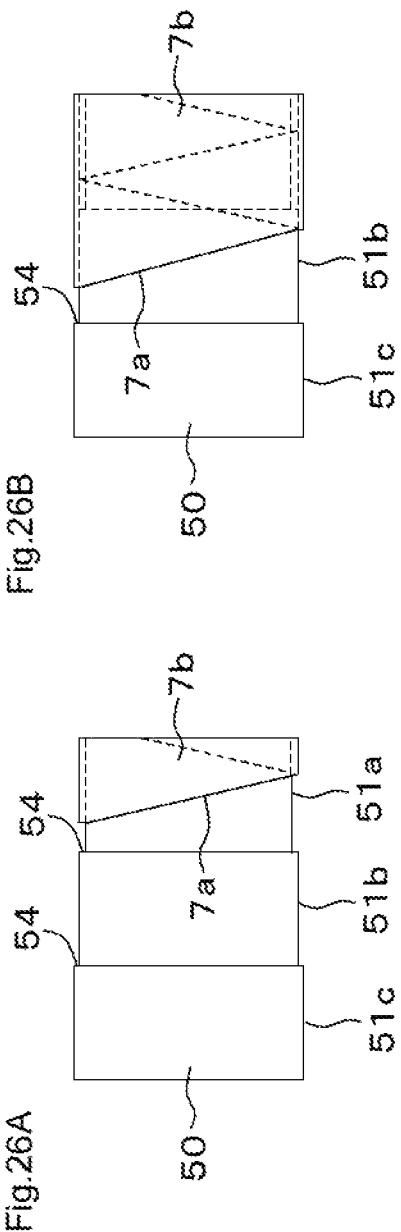

More specifically, as is shown in FIG. 26B, in the second turn of the winding, the sheet-like belt 8*b* is wound over a portion including the sheet-like belt 8*b* wound around the small-diameter portion 51*a* earlier and the intermediate-diameter portion 51*b* of the winding cylinder 50 (this portion will be referred to as "second turn winding surface"). A diameter of the sheet-like belt 8*b* wound around the small-diameter portion 51*a* earlier and the diameter of the intermediate-diameter portion 51*b* are equal. Hence, the sheet-like belt 8*b* wound over the second turn winding surface including the foregoing portions is hard to become wrinkled. An outer diameter of the sheet-like belt 8*b* wound over the second turn winding surface is equal to the outer diameter of the large-diameter portion 51*c*.

Figure 26C:
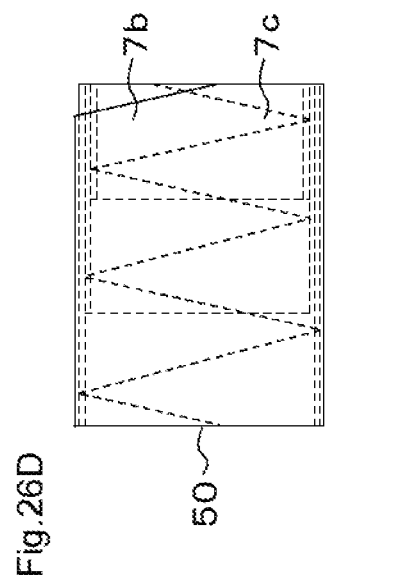

Subsequently, as is shown in FIG. 26C, in a third turn of the winding, the sheet-like belt 8*b* is wound over a portion including the sheet-like belt 8*b* wound earlier over the second turn winding surface and the large-diameter portion 51*c* of the winding cylinder 50 (this portion will be referred to as "third turn winding surface"). A diameter of the sheet-like belt 8*b* wound earlier over the second turn winding surface and the diameter of the large-diameter portion 51*c* are equal. Hence, the sheet-like belt 8*b* wound over the third turn winding surface including the foregoing portions is hard to become wrinkled. In the case described herein, winding of the inclined region 7*b* at the winding start tip ends during the third turn of the winding.

After the entire inclined region 7*b* of the sheet-like belt 8*b* at the winding start tip is completely wound, the maximum width region 7*c* and the inclined region 7*b* at the winding end tip are continuously wound. The maximum width region 7*c* is wound over the sheet-like belt 8*b* wound earlier over the third turn winding surface. The inclined region 7*b* at the winding end tip to be wound next is wound over portions of the sheet-like belt 8*b* wound earlier.

Figure 26D:
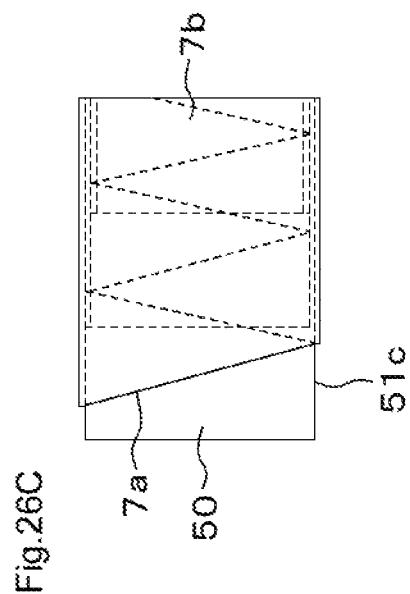

More specifically, as is shown in FIG. 26D, in fourth and subsequent turns of the winding following FIG. 26C, a portion of the sheet-like belt 8*b* substantially as narrow as or narrower than the portions of the sheet-like belt 8 wound earlier is wound. Hence, in the fourth and subsequent turns of the winding, the sheet-like belt 8*b* is naturally wound over a substantially flat or flat surface. The sheet-like belt 8*b* is thus hard to become wrinkled.

As has been described, by winding the sheet-like belt 8*b* around the winding cylinder 50 provided with the above-specified number of the steps 54 having the above-specified height, the sheet-like belt 8*b* can be constantly wound over a substantially flat or flat portion.

(6) Molding of Cylindrical Belt 8*c*

Subsequently, the winding cylinder 50 wound with the single sheet-like belt 8*b* is removed from the winding device 80, transported, and attached to the laminating device 60.

Figure 27:
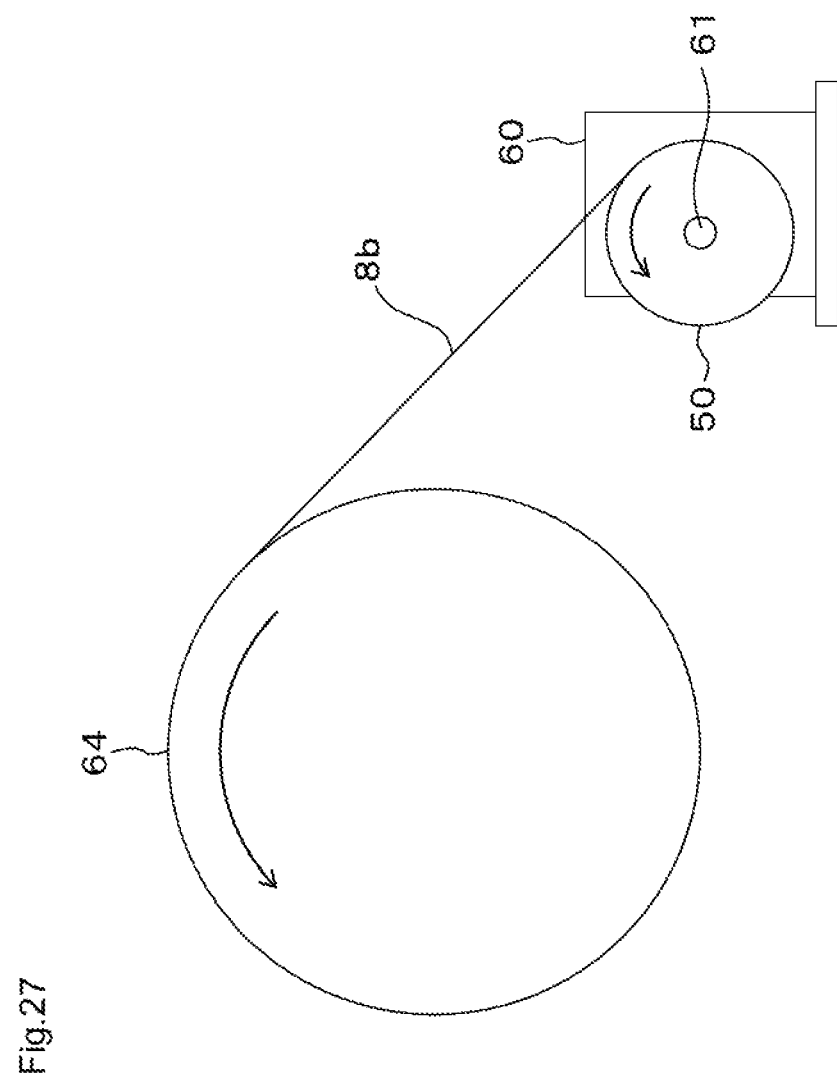
FIG. 27 is a view showing a manner in which the cylindrical belt is molded with arrows indicating rotation directions of the molding drum and the winding cylinder.

Subsequently, the tip end of the sheet-like belt 8*b* is pulled out from the winding cylinder 50 attached to the lamination device 60 and laminated to the molding drum 64. As is shown in FIG. 27, the molding drum 64 starts to rotate in this state and the sheet-like belt 8*b* is wound around the molding drum 64 from the winding cylinder 50.

The longitudinal direction of the sheet-like belt 8*b* and the circumferential direction of the winding cylinder 50 wound with the sheet-like belt 8*b* coincide with each other and the rotation shaft 61 of the laminating device 60 and the rotation shaft of the molding drum 64 are parallel to each other. Hence, the sheet-like belt 8*b* unwound from the winding cylinder 50 is wound around the molding drum 64 in such a manner that the longitudinal direction coincides with the circumferential direction of the molding drum 64.

Lamination of the sheet-like belt 8*b* to the molding drum 64 ends when the sheet-like belt 8*b* is wound around the molding drum 64 to the rear end. In order to wind the sheet-like belt 8*b* to the rear end, the molding drum 64 rotates, for example, a little less than twice (that is, once to wind the inclined region 7*b* at the tip end and the maximum width region 7*c* and a little less than once to wind the inclined region 7*b* at the rear end). When the lamination ends, the inclined side portions 7*a* of the original sheet-like belt 8*b* on both sides in the longitudinal direction match each other on a same line on the molding drum 64 as is shown in FIG. 2C or an extremely narrow spacing (for example, a spacing of 5 mm or less in a direction orthogonal to the inclined side portions 7*a*) is left between the both inclined side portions 7*a*. In the manner as above, a single cylindrical belt 8*c* is molded from a single sheet-like belt 8*b*.

4. Advantages

As has been described, the present invention includes feeding the master roll 8*a* from the master roll table 10 to the belt table 14, cutting out the sheet-like belt 8*b* for one full circle of tire by cutting the master roll 8*a* diagonally with respect to the longitudinal direction between the master roll table 10 and the belt table 14, moving the belt table 14 carrying the cut-out sheet-like belt 8*b* for one full circle of tire to the winding position of the sheet-like belt 8*b*, winding the sheet-like belt 8*b* for one full circle of tire around the single winding cylinder 50 at the winding position, unwinding the sheet-like belt 8*b* from the winding cylinder 50 in a place facing the molding drum 64 and forming the cylindrical belt 8*c* by winding the sheet-like belt 8*b* around the molding drum 64. Hence, the present invention provides a novel manufacturing method of a tire belt that can be formed by cutting the master roll 8*a* only once.

In the present invention, a single sheet-like belt 8*b* is cut out by cutting the master roll 8*a* only once. Hence, a step of forming an intermediate sheet by joining cut sheets obtained by cutting a master roll and a facility for this step required in the related art are no longer necessary. Consequently, manufacturing efficacy becomes satisfactory and a facility space can be saved.

When a pneumatic tire 1 is manufactured by using the present invention, as many sheet-like belts 8*b* as necessary can be cut out depending on how many pneumatic tires 1 are to be manufactured. Hence, the sheet-like belts 8*b* do not become an intermediate stock. The present invention is therefore suitable to a small lot production.

In a case where sheet-like belts 8*b* for multiple full circles of tire (that is, multiple sheet-like belts 8*b*) are wound around the single winding cylinder 50 one over another, a sheet-like belt 8*b* on the inner radius side and a sheet-like belt 8*b* on the outer radius side are curled differently, and a sheet-like belt 8*b* on the inner radius side and a sheet-like belt 8*b* on the outer radius side require different forces when unwound from the winding cylinder 50. Hence, deformation, such as elongation, varies between a sheet-like belt 8*b* on the inner radius side and a sheet-like belt 8*b* on the outer radius side. By contrast, in the present invention, a sheet-like belt 8*b* for one full circle of tire is wound around the single winding cylinder 50. Hence, deformation hardly varies from one sheet-like belt 8*b* to another.

When a long intermediate sheet is cut in a place facing the molding drum 64 as in the related art, a wide space is required in front of the molding drum 64. By contrast, in the present invention, the sheet-like belt 8*b* is only unwound from the winding cylinder 50 in a place facing the molding drum 64. Hence, a wide space is no longer necessary in front of the molding drum 64.

In a case where the sheet-like belt 8*b* is cut out by cutting the master roll 8*a* at an angle in a rage of 6° to 9° both inclusive with respect to the longitudinal direction, an angle produced between the longitudinal direction of the sheet-like belt 8*b* and the belt cords 9 (and the inclined side portions 7*a*) falls within a range of 6° to 9° both inclusive. When an angle produced between the longitudinal direction of the sheet-like belt 8*b* and the inclined side portions 7*a* is 6° or greater, the inclined side portions 7*a* do not become too long. Hence, the inclined side portions 7*a* of the sheet-like belt 8*b* on the both sides in the longitudinal direction can be readily matched on a same line on the molding drum 64 during the molding. When an angle produced between the longitudinal direction of the sheet-like belt 8*b* and the belt cords 9 is 9° or less, a restraint force of the finished belt 8 in the tire radial direction becomes sufficiently high.

When a cutting angle of the master roll 8*a* with respect to the longitudinal direction is too small, there is a possibility that the master roll 8*a* is not cut well. However, such a possibility can be eliminated by cutting the master roll 8*a* at an angle of 6° or greater with respect to the longitudinal direction.

What is claimed is:

1. A manufacturing method of a tire belt for manufacturing a sheet-like belt first from a master roll formed by covering multiple belt cords lined up parallel to one another with rubber while aligning a longitudinal direction of the master roll in an extending direction of the belt cords, and then forming a cylindrical belt by winding the sheet-like belt around a molding drum, comprising:

placing the master roll on a master roll table;

feeding the master roll from the master roll table to a belt table situated adjacent to the master roll table in a same direction as the longitudinal direction of the master roll;

cutting out a portion of the master roll placed on the belt table as the sheet-like belt for one full circle of a tire by cutting the master roll diagonally with respect to the longitudinal direction between the master roll table and the belt table; wherein the master roll is fixed onto the belt table by attraction when the master roll is cut between the master roll table and the belt table, moving the belt table carrying the cut-out sheet-like belt for one full circle of the tire to a winding position of the sheet-like belt; wherein in moving the belt table to the winding position of the sheet-like belt, the belt table is moved to the winding position of the sheet-like belt while the cut-out sheet-like belt is fixed onto the belt table by attraction, and in moving the belt table to the winding position of the sheet-like belt, the belt table is moved in a direction orthogonal to a longitudinal direction of the belt table, winding the sheet-like belt for one full circle of the tire around a single winding cylinder at the winding position; wherein in winding the sheet-like belt for one full circle of the tire around the single winding cylinder at the winding position, the sheet-like belt is wound by moving the winding cylinder in the longitudinal direction of the belt table while the winding cylinder is rotated around a rotation shaft thereof, moving the sheet-like belt wound around the winding cylinder to a place facing the molding drum; and unwinding the sheet-like belt from the winding cylinder in the place facing the molding drum and forming the cylindrical belt by winding the unwound sheet-like belt around the molding drum in one continuous circle, wherein in unwinding the sheet-like belt from the winding cylinder and forming the cylindrical belt by winding the unwound sheet-like belt around the molding drum, the rotation shaft of the winding cylinder and a rotation shaft of the molding drum are placed to be parallel to each other.

2. The manufacturing method of the tire belt according to claim 1, wherein:

the sheet-like belt is cut out by cutting the master roll at an angle in a range of 6° to 9° both inclusive with respect to the longitudinal direction.

3. The manufacturing method of the tire belt according to claim 1, wherein:

side portions of the sheet-like belt include cut side portions which are formed by the cutting and form both end portions of the cylindrical belt in an axial direction; and let W be a width of the master roll, θ be a cutting angle of the master roll with respect to the longitudinal direction, and L be a length of the cut side portions, then, W is given by: $W = L \times \sin \theta$.

4. The manufacturing method of the tire belt according to claim 1, wherein:

during the step of feeding the master roll from the master roll table to the belt table, the master roll is fed by holding a front part of the master roll in a feeding direction with a first hand and holding a rear part trailing the front part in the feeding direction with a second hand; and the front part of the master roll in the feeding direction is continuously held by the first hand from start to end of the feeding.

5. The manufacturing method of the tire belt according to claim 1, further comprising:

measuring a length of the cut-out sheet-like belt for one full circle of the tire on the belt table; and making a pass or fail determination as to the length of the sheet-like belt, wherein the sheet-like belt is wound around the winding cylinder and transported to a place for lamination to the molding drum only when a pass determination is made in the step of making of a pass or fail determination as to the length of the sheet-like belt.

6. The manufacturing method of the tire belt according to claim 1, wherein:

the sheet-like belt has an inclined side portion inclined with respect to the longitudinal direction;

a radial difference is given by providing a step to the winding cylinder to make a diameter smaller on one side in an axial direction and larger on the other side in the axial direction; and in the step of winding the sheet-like belt around the winding cylinder, winding of the sheet-like belt is started in a small-diameter portion of the winding cylinder from a tip end of the inclined side portion as a winding start tip, and the sheet-like belt is wound continuously around the winding cylinder in more than one turn of the winding cylinder.

7. The manufacturing method of the tire belt according to claim 1, wherein:

the step of winding the sheet-like belt for one full circle of the tire around the single winding cylinder further includes, attracting the sheet-like belt onto the belt table at multiple points lined up in the longitudinal direction; and winding the sheet-like belt around the winding cylinder by moving the winding cylinder in the longitudinal direction of the sheet-like belt while rotating the winding cylinder above the sheet-like belt, and cancelling attraction at the multiple points one after another to which the winding cylinder has moved.

8. The manufacturing method of the tire belt according to claim 7, wherein attracting the sheet-like belt onto the belt table comprises magnets lined up in the longitudinal direction.

9. The manufacturing method of the tire belt according to claim 7, wherein attracting the sheet-like belt onto the belt table comprises a suction device lined up in the longitudinal direction.

10. The manufacturing method of the tire belt according to claim 1, wherein the winding cylinder comprises an insertion hole.

11. The manufacturing method of the tire belt according to claim 10, wherein a winding start tip of the sheet-like belt is pushed up and inserted into the insertion hole of the winding cylinder while the winding cylinder moves by rotating.

12. The manufacturing method of the tire belt according to claim 11, wherein a notch is provided at an edge of a rear portion of the belt table facing the master roll table, an air cylinder is disposed below the notch and a push-up rod is attached to the air cylinder;

wherein the push-up rod moves up above a top surface of the belt table and pushes up the sheet-like belt on the winding cylinder.

13. The manufacturing method of the tire belt according to claim 1, wherein the sheet-like belt for one full circle of the tire is cut out by cutting the master roll only once.

14. The manufacturing method of the tire belt according to claim 1, wherein the longitudinal direction of the belt table inclines with respect to a longitudinal direction of the master roll table, in placing the master roll on the master roll table, the longitudinal direction of the master roll is in a same direction as the longitudinal direction of the master roll table; and when the master roll is cut between the master roll table and the belt table, the master roll is cut in the longitudinal direction of the belt table along the belt table, so that the master roll is cut diagonally with respect to the longitudinal direction of the master roll and the extending direction of the belt cords.

\* \* \* \* \*